US009659594B2

(12) United States Patent
Meyer

(10) Patent No.: US 9,659,594 B2
(45) Date of Patent: May 23, 2017

(54) INTEGRATED RECORDING HEAD WITH SELECTIVE MOVEMENT

(71) Applicant: Dallas W. Meyer, Prior Lake, MN (US)

(72) Inventor: Dallas W. Meyer, Prior Lake, MN (US)

(73) Assignee: Dallas W. Meyer, Prior Lake, MN (US)

( * ) Notice: Subject to any disclaimer, the term of this patent is extended or adjusted under 35 U.S.C. 154(b) by 259 days.

(21) Appl. No.: 13/776,921

(22) Filed: Feb. 26, 2013

(65) Prior Publication Data
US 2013/0170072 A1 Jul. 4, 2013
US 2017/0110149 A9 Apr. 20, 2017

Related U.S. Application Data

(60) Continuation of application No. 13/647,168, filed on Oct. 8, 2012, now Pat. No. 9,070,413, which is a
(Continued)

(51) Int. Cl.
*G11B 21/21* (2006.01)
*G11B 5/56* (2006.01)
(Continued)

(52) U.S. Cl.
CPC ............... *G11B 21/21* (2013.01); *G11B 5/48* (2013.01); *G11B 5/4826* (2013.01);
(Continued)

(58) Field of Classification Search
CPC ... G11B 5/5552; G11B 5/6058; G11B 5/4873; G11B 21/21; G11B 5/48; G11B 5/4826;
(Continued)

(56) References Cited

U.S. PATENT DOCUMENTS 3,064,333 A 11/1962 Kristiansen et al.
3,258,750 A 6/1966 Shew
(Continued)

FOREIGN PATENT DOCUMENTS

EP 1672654 6/2006
JP 2003-208769 7/2003

OTHER PUBLICATIONS

U.S. Appl. No. 13/647,168, filed Oct. 8, 2012, Dallas W. Meyer.
(Continued)

*Primary Examiner* — Julie Anne Watko
(74) *Attorney, Agent, or Firm* — Workman Nydegger

(57) ABSTRACT

In one example, a head is provided that may include a slider body, a transducer body, a transducer connected to the transducer body, and an interleaver assembly interconnecting the slider body and the transducer body. The interleaver assembly may include an interleaver body to which the transducer body is attached, the interleaver body having a plurality of geometric features that enable temporary deformation of the interleaver body in response to exertion of a force on the interleaver body, and the interleaver body may further include piezoelectric elements positioned in the interleaver body, the piezoelectric elements operable such that, when selectively actuated, the piezoelectric elements exert a force on the interleaver body so as to effect selective movement of the transducer with respect to a surface of a medium.

24 Claims, 17 Drawing Sheets

Related U.S. Application Data division of application No. 12/914,688, filed on Oct. 28, 2010, now Pat. No. 8,284,524, which is a division of application No. 12/472,325, filed on May 26, 2009, now Pat. No. 7,835,115, which is a division of application No. 10/900,713, filed on Jul. 27, 2004, now Pat. No. 7,538,983.

(60) Provisional application No. 60/490,750, filed on Jul. 29, 2003.

(51) Int. Cl.
    *G11B 5/58* (2006.01)
    *G11B 5/48* (2006.01)
    *G11B 5/55* (2006.01)
    *G11B 5/592* (2006.01)

(52) U.S. Cl.
    CPC .......... *G11B 5/4873* (2013.01); *G11B 5/5552* (2013.01); *G11B 5/58* (2013.01)

(58) Field of Classification Search
    CPC ......... G11B 5/58; G11B 5/5569; G11B 5/581; G11B 5/592; G11B 5/6011; G11B 5/6035; G11B 5/596
    USPC .................................... 360/294.4, 294.7, 75
    See application file for complete search history.

(56) References Cited

U.S. PATENT DOCUMENTS

| | | |
|---|---|---|
| 3,593,331 A | 7/1971 | Connell et al. |
| 3,753,252 A | 8/1973 | Tietz |
| 4,599,667 A | 7/1986 | van Blerk |
| 4,605,977 A * | 8/1986 | Matthews ................ 360/234.7 |
| 4,783,705 A | 11/1988 | Moon et al. |
| 4,802,050 A | 1/1989 | Miyabayashi et al. |
| 5,023,991 A | 6/1991 | Smith |
| 5,060,210 A | 10/1991 | Fennema et al. |
| 5,193,034 A | 3/1993 | Tsuyoshi et al. |
| 5,210,672 A | 5/1993 | Ivers et al. |
| 5,278,703 A | 1/1994 | Rub et al. |
| 5,350,618 A | 9/1994 | Togawa et al. |
| 5,454,158 A | 10/1995 | Fontana et al. |
| 5,521,778 A | 5/1996 | Boutaghou et al. |
| 5,689,057 A | 11/1997 | Baumgart et al. |
| 5,834,864 A | 11/1998 | Hesterman et al. |
| 5,841,608 A | 11/1998 | Kasamatsu et al. |
| 5,858,474 A | 1/1999 | Meyer et al. |
| 5,943,189 A * | 8/1999 | Boutaghou et al. ........ 360/234.7 |
| 5,956,217 A | 9/1999 | Xuan et al. |
| 6,075,673 A | 6/2000 | Wilde et al. |
| 6,078,468 A | 6/2000 | Fiske |
| 6,091,537 A | 7/2000 | Sun et al. |
| 6,101,058 A | 8/2000 | Morris |
| 6,153,281 A | 11/2000 | Meyer et al. |
| 6,154,335 A | 11/2000 | Smith et al. |
| 6,164,118 A | 12/2000 | Suzuki et al. |
| 6,166,879 A | 12/2000 | Jordan |
| 6,239,936 B1 | 5/2001 | Abraham et al. |
| 6,262,868 B1 | 7/2001 | Arya et al. |
| 6,282,066 B1 * | 8/2001 | Bonin ........................ 360/294.1 |
| 6,314,814 B1 | 11/2001 | Brannon et al. |
| 6,368,425 B1 | 4/2002 | Segar et al. |
| 6,384,510 B1 | 5/2002 | Grade et al. |
| 6,404,599 B1 | 6/2002 | Vigna |
| 6,414,827 B1 | 7/2002 | Young et al. |
| 6,417,981 B1 | 7/2002 | Smith |
| 6,421,211 B1 | 7/2002 | Hawwa et al. |
| 6,440,520 B1 | 8/2002 | Baglin et al. |
| 6,452,735 B1 | 9/2002 | Egan et al. |
| 6,452,755 B2 | 9/2002 | Bonin |
| 6,465,929 B1 | 10/2002 | Levitan et al. |
| 6,469,859 B1 | 10/2002 | Chainer et al. |
| 6,487,045 B1 * | 11/2002 | Yanagisawa ............... 360/236.5 |
| 6,490,118 B1 | 12/2002 | Ell et al. |
| 6,493,177 B1 | 12/2002 | Ell et al. |
| 6,501,623 B1 | 12/2002 | Sassolini et al. |
| 6,519,107 B1 | 2/2003 | Ehrlich et al. |
| 6,522,494 B1 | 2/2003 | Magee |
| 6,535,360 B1 | 3/2003 | Kim et al. |
| 6,542,281 B2 | 4/2003 | Feldman et al. |
| 6,545,970 B2 | 4/2003 | Durnin et al. |
| 6,547,975 B1 | 4/2003 | Kobrin |
| 6,556,380 B2 | 4/2003 | Bunch et al. |
| 6,563,665 B1 | 5/2003 | Ell |
| 6,587,312 B2 | 7/2003 | Murari et al. |
| 6,594,119 B1 | 7/2003 | Koshikawa et al. |
| 6,600,619 B1 | 7/2003 | Morris et al. |
| 6,600,634 B1 | 7/2003 | Kim et al. |
| 6,611,399 B1 * | 8/2003 | Mei et al. .................. 360/234.7 |
| 6,633,451 B1 | 10/2003 | Chainer et al. |
| 6,662,623 B2 | 12/2003 | Baumgartner et al. |
| 6,683,757 B1 | 1/2004 | Bonin et al. |
| 6,690,543 B2 * | 2/2004 | Kurita et al. .............. 360/234.7 |
| 6,697,232 B1 * | 2/2004 | Hipwell et al. ............ 360/294.5 |
| 6,724,558 B2 | 4/2004 | Bryant et al. |
| 6,747,836 B2 | 6/2004 | Stevens et al. |
| 6,762,899 B2 | 7/2004 | Ottesen et al. |
| 6,768,610 B1 | 7/2004 | Morris et al. |
| 6,785,086 B1 | 8/2004 | Bonin et al. |
| 6,859,346 B1 | 2/2005 | Meyer |
| 6,870,709 B2 | 3/2005 | Shimanouchi et al. |
| 6,914,746 B1 | 7/2005 | Meyer |
| 7,092,194 B2 | 8/2006 | Meyer |
| 7,095,591 B2 | 8/2006 | Imamura et al. |
| 7,180,650 B2 | 2/2007 | Epitaux |
| 7,209,309 B2 * | 4/2007 | Kurita et al. .................. 360/75 |
| 7,218,471 B2 | 5/2007 | Meyer |
| 7,248,442 B1 | 7/2007 | Meyer |
| 7,369,369 B1 * | 5/2008 | Meyer ................. G11B 5/5552 360/294.5 |
| 7,538,983 B1 | 5/2009 | Meyer |
| 7,589,938 B2 * | 9/2009 | Gatzen ..................... 360/294.7 |
| 7,835,115 B2 | 11/2010 | Meyer |
| 7,849,585 B1 | 12/2010 | Meyer |
| 8,279,559 B1 | 10/2012 | Meyer |
| 8,284,524 B2 | 10/2012 | Meyer |
| 8,307,542 B2 | 11/2012 | Meyer |
| 8,310,779 B2 | 11/2012 | Hanchi et al. |
| 8,643,980 B1 * | 2/2014 | Fowler .................. G11B 5/596 360/234.3 |
| 2001/0009776 A1 | 7/2001 | Ferrari et al. |
| 2002/0101129 A1 | 8/2002 | Grade et al. |
| 2002/0191342 A1 * | 12/2002 | Yanagisawa ............... 360/236.5 |
| 2003/0093894 A1 | 5/2003 | Dugas et al. |
| 2003/0161061 A1 | 8/2003 | Lamberts |
| 2003/0161070 A1 | 8/2003 | Bonin |
| 2003/0161071 A1 | 8/2003 | Bonin et al. |
| 2003/0197969 A1 | 10/2003 | Szita et al. |
| 2004/0085670 A1 | 5/2004 | Li et al. |
| 2004/0119376 A1 | 6/2004 | Chou et al. |
| 2004/0160702 A1 | 8/2004 | Hirano et al. |
| 2005/0052723 A1 | 3/2005 | Watanabe et al. |
| 2005/0062361 A1 | 3/2005 | Harley et al. |
| 2005/0179338 A1 | 8/2005 | Tamura |
| 2005/0237597 A1 | 10/2005 | Epitaux et al. |
| 2009/0296264 A1 | 12/2009 | Meyer |
| 2010/0064395 A1 | 3/2010 | Clark |
| 2011/0072645 A1 * | 3/2011 | Meyer ........................ 29/603.07 |

OTHER PUBLICATIONS

Bhushan, Chemical, mechanical and tribological characterization of ultra-thin and hard amorphous carbon coatings as thin as 3.5 nm: recent developments, Diamond and Related Materials, 8, (1999), 1985-2015.

Lee et al. "Bistable planar polysilicon microactuators with shallow arch-shaped leaf springs." Proc. SPIE, 3876, 274 (1999).

U.S. Appl. No. 10/818,641, Jul. 20, 2007, Final Office Action.

U.S. Appl. No. 10/818,641, Jan. 8, 2008, Notice of Allowance.

U.S. Appl. No. 10/900,713, May 10, 2007, Office Action.

(56) References Cited

OTHER PUBLICATIONS

U.S. Appl. No. 10/900,713, Nov. 26, 2007, Final Office Action.
U.S. Appl. No. 10/900,713, Jun. 3, 2008, Office Action.
U.S. Appl. No. 10/900,713, Oct. 30, 2008, Final Office Action.
U.S. Appl. No. 10/900,713, Feb. 9, 2009, Notice of Allowance.
U.S. Appl. No. 12/115,396, Feb. 19, 2010, Office Action.
U.S. Appl. No. 12/115,396, Sep. 29, 2010, Notice of Allowance.
U.S. Appl. No. 12/472,325, Apr. 26, 2010, Office Action.
U.S. Appl. No. 12/472,325, Sep. 2, 2010, Notice of Allowance.
U.S. Appl. No. 12/651,961, Jun. 5, 2012, Notice of Allowance.
U.S. Appl. No. 12/914,688, May 26, 2011, Office Action.
U.S. Appl. No. 12/914,688, Nov. 30, 2011, Final Office Action.
U.S. Appl. No. 12/914,688, Jun. 6, 2012, Notice of Allowance.
U.S. Appl. No. 12/963,415, Jul. 10, 2012, Notice of Allowance.
Hirano et al, "High-bandwidth HDD Tracking Servo by a Moving-slider Micro-actuator", IEEE Trans. Magnetics, v. 35, No. 5, Sep. 1999.
Fan et al, "Electrostatic Microactuator and Design Considerations for HDD Applications", IEEE Trans. Magnetics, v. 35, No. 2, Mar. 1999.

* cited by examiner

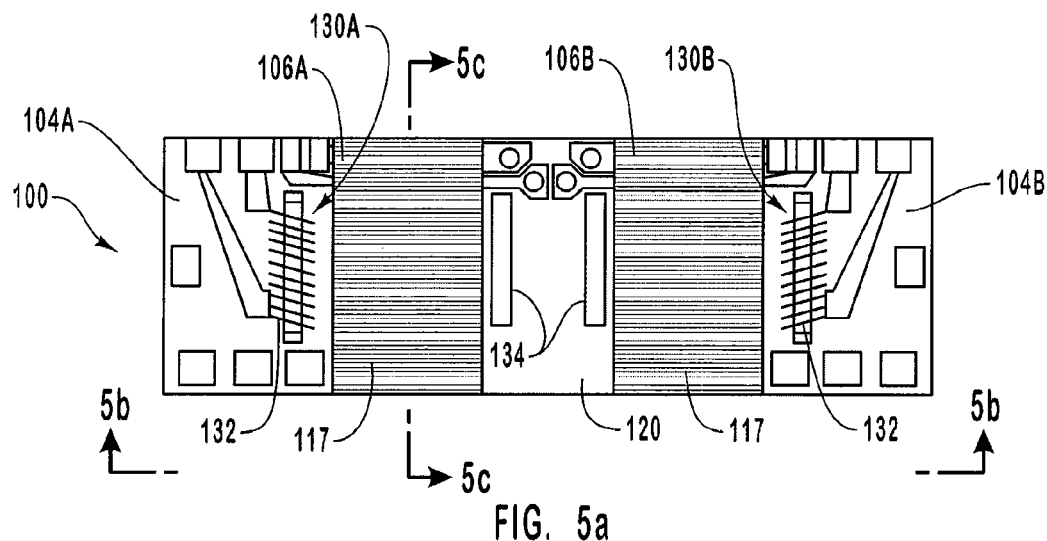
FIG. 5a
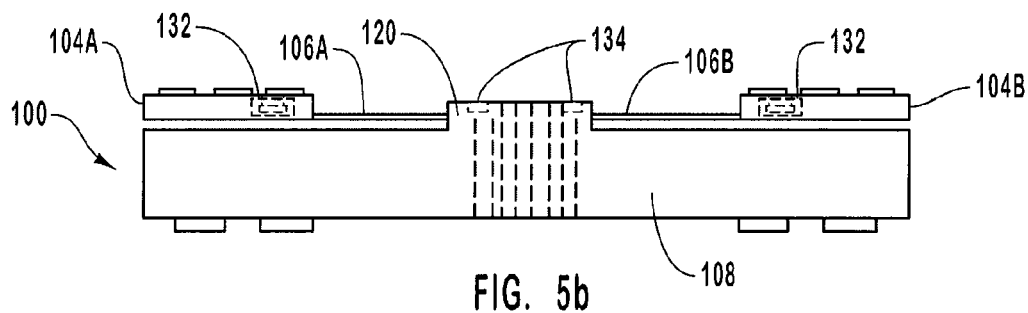
FIG. 5b
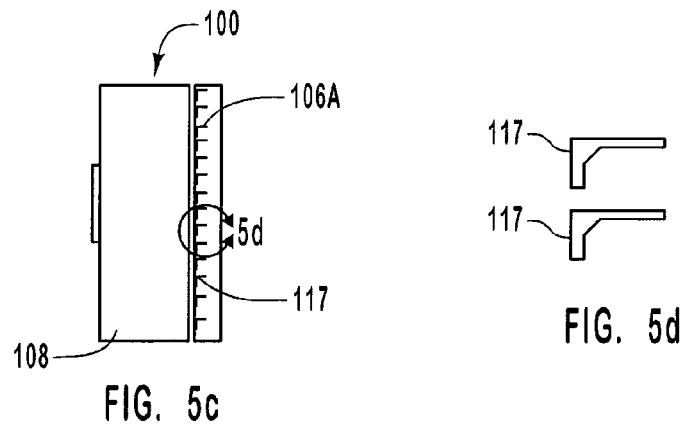
FIG. 5c
FIG. 5d

INTEGRATED RECORDING HEAD WITH SELECTIVE MOVEMENT

CROSS-REFERENCE TO RELATED APPLICATIONS

This application is a continuation of U.S. application Ser. No. 13/647,168, filed Oct. 8, 2012, which is a divisional application of U.S. application Ser. No. 12/914,688, filed Oct. 28, 2010 (now issued as U.S. Pat. No. 8,284,524), which is a divisional of U.S. application Ser. No. 12/472,325, filed on May 26, 2009, (now issued as U.S. Pat. No. 7,835,115), which is a divisional of U.S. application Ser. No. 10/900,713 filed Jul. 27, 2004 (now issued as U.S. Pat. No. 7,538,983), which claims the benefit of U.S. Provisional Patent Application Ser. No. 60/490,750, filed Jul. 29, 2003. All of the foregoing applications are incorporated herein in their respective entireties by this reference.

BACKGROUND

The Field of the Invention

The present invention generally relates to data storage on rotating magnetic storage devices. More specifically, the present invention relates to a rotating magnetic storage device having a recording head that is bi-directionally controlled.

The Related Technology

During recent years, there has been a steady improvement in the volume of data that can be stored on magnetic storage media, such as hard disk drives used in computers. Today, a single 3.5 inch magnetic storage disk can store twenty gigabytes or more of data. At the same time, storage capacity per unit cost has fallen dramatically, which has enabled individual users and enterprises to radically change the way in which data is recorded and stored. Indeed, the ability to store large volumes of data inexpensively has been a driving factor in the information technology revolution during recent decades.

Conventional storage media include solid-state devices, drive arrays (RAID), single rotating magnetic disk drives, and removable optical media. FIG. 1 is a graph that illustrates tradeoffs between performance and cost associated with typical storage media used in combination with computers. As shown, removable optical storage devices, such as optical read-only or read-write disks, generally provide the least expensive alternative for storing large amounts of data. However, single rotating magnetic devices, such as hard disk drives used in large numbers of personal computers, provide mass storage that is almost as cost effective as removable optical devices, but with better performance. In this context, the term "performance" relates primarily to the reliability and access times associated with the various storage media. As shown in FIG. 1, however, the performance of single rotating magnetic storage devices is increasing less rapidly than the performance of RAID and solid-state devices.

Although magnetic storage devices are widely used and have become significantly less expensive during recent years, a number of technological hurdles have been encountered which threaten to reduce the rate at which future improvements in cost and performance will occur. FIG. 2 is a perspective view of a conventional magnetic storage device. Magnetic disk drive 10 includes a rotating magnetic storage medium 12 that, as mentioned above, can store tens of gigabytes of data in an area of only a few square inches. A head gimbal assembly 14 ("HGA") positions a recording head 16 with a transducer in close proximity to the surface of the magnetic storage medium 12 to enable data to be read from and written to the storage medium. An actuator assembly 18 rotates the HGA 14 during operation to position the transducer of the recording head 16 at the proper location over the rotating magnetic storage medium 12.

One of the most significant problems that have arisen in the effort to improve capacity and performance in magnetic storage devices is track following, or the ability to quickly and reliably position the transducer of the recording head 16 over the appropriate track on the magnetic storage medium 12. In conventional devices, the actuator assembly 18 includes a voice coil that uses a feedback loop based on servo tracks that are embedded between the data tracks on the magnetic storage medium 12. The track pitch (i.e., the spacing between adjacent tracks) of the magnetic storage medium 12 in conventional devices is as low as 0.2 microns. At such small track pitches, non-repeatable motions of the rotating magnetic storage medium 12, the HGA 14, and the other mechanical components of disk drive 10 make it increasingly difficult to reliably follow the data tracks on the magnetic storage medium. For example, in devices having an HGA 14 with a length of 1.5 inches to the recording head 16 and a track pitch of 0.2 microns, the angular position of the head gimbal assembly needs to have resolution better than 33 millionths of an arc second in order to adequately follow the tracks on the magnetic storage medium 12. Efforts to achieve adequate track following have included the use of smaller disks for high speed drives, fluid motors for improved damping, and active rotational feedback sensors using negative feedback algorithms. However, the use of such techniques can lead to either the loss of capacity or are only temporary solutions to this problem, as track pitches continue to decrease.

A closely related problem is that of the settling time and performance, which relates to the ability to stabilize the recording head over a track. The settling time is dictated by the inertial loads and the exciting resonant frequencies associated with the act of accessing a selected track, the amount of damping in the HGA 14, and the servo bandwidth. These factors are generally limited by the resonant frequencies in the arm of the HGA 14. Thus, settling times have not significantly improved in the last several generations of drives in view of the fundamental limitations on the mechanics of drives that use a recording head 16 controlled by an HGA 14 and an actuator assembly 18, as shown in FIG. 2.

As both the track pitch and the size of sector regions on the magnetic media used to physically record bits of data have decreased, transducers in disk drives have been required to be positioned closer to the surface of the magnetic storage device. A representation of the distance between the transducer and the surface of the magnetic storage medium, referred to as the fly height 22, is shown in FIG. 3. Current fly heights are now as small as 50 Angstroms (Å) in high capacity disk drives. The fly height is dictated by the fundamental resolution requirements associated with the magnetic storage device, which is a function of the track pitch and the size of the regions on which bits of data are physically recorded. If the fly height becomes too large during operation, the transducer becomes unable to resolve bits encoded in the storage medium. On the other hand, if the transducer is brought into physical contact with the optical storage medium, which can be traveling at speeds on the order of 100 miles per hour, both the transducer and the storage device can be damaged.

The fly height has been controlled in conventional devices by improving the manufacturing tolerances, by designing a highly rigid and dampened HGA 14, and by the use of air bearings associated with the recording head 16. An air bearing is a cushion or layer of air that develops between the surface of the magnetic storage medium and the adjacent surface of the transducer as the storage medium moves underneath the transducer.

As noted above, as the fly heights required in magnetic storage devices have decreased, the problem of transducer damage from excessive media contact has become more pronounced. Current giant magnetoresistance ("GMR") and tunneling magnetoresistance ("TMR") transducer heads are sensitive to being damaged if excessive contact with the storage medium is experienced. One related problem is that conventional transducer designs often lead to thermal pole tip protrusion, which occurs when the transducer is heated and the tip, or pole, of the transducer extends and protrudes beyond the plane of the transducer. Thermal pole tip protrusion can aggravate the contact of the transducer with the storage medium and can lead to increased or more rapid damage of the transducer.

These problems currently facing the magnetic storage device industry threaten to impede the ongoing progress in reliability, performance, and cost that has been achieved during recent years. Although many of these problems can be overcome to some degree using conventional head gimbal assembly designs, it is unlikely that these problems can be successfully overcome while keeping costs for disk drive users down.

One approach that is currently being developed to lessen the effects of the challenges discussed above involves a technique called second stage actuation. Second stage actuation systems use a dual actuation method for controlling the horizontal tracking position of the head over a servo mark positioned on the surface of the storage medium. A coarse actuator, similar to a HGA, positions the recording head to a global position, and a fine actuator with a single, horizontal degree of freedom at the head positions the head and transducer to a fine position. While this technique can be adequately practiced in connection with previous versions of magnetic storage media, the increased density on newer discs requires closer tolerances on the fly height, as discussed above. As the fly heights of newer storage systems continually decrease, second stage actuation technology becomes increasingly inadequate, particularly in light of the fact that transducer positioning is limited to adjustment in only the horizontal direction.

Additionally, it is known that previous methods have been attempted to measure fly height of a recording head above the surface of a magnetic storage medium. These methods include calculations involving capacitance, ratios of certain harmonic amplitudes, and vibrational aspects of piezo-electric devices mounted on the recording head. However, these methods have proven inadequate in precisely controlling and calibrating fly height and other possible movements of the recording head in newer magnetic storage devices.

SUMMARY OF SELECTED EMBODIMENTS OF THE INVENTION

Briefly summarized, embodiments of the present invention are generally directed to improving the performance and use of magnetic storage media, such as hard disk drives. More specifically, the present invention is directed to a rotating magnetic storage medium having a recording head that is bi-directionally controlled with respect to the surface of a magnetic medium. Bi-directional control of the recording head results in improved head positioning precision, thereby enabling more reliable access to data stored on and written to the hard disk drive.

In one embodiment a magnetic storage medium, such as a hard disk drive, is disclosed. The hard disk drive includes a magnetic medium, such as a hard disk, that is accessed by a recording head. The recording head is supported by a head gimbal assembly having a macroactuator that is movable to coarsely position the recording head with respect to the surface of the magnetic medium. The recording head is bi-directionally movable in order to precisely position a transducer of the recording head with respect to the magnetic medium surface. This is achieved with an interleaver assembly that is included as a component of the recording head and is interposed between a slider body and the transducer.

In one embodiment, the interleaver assembly includes a plurality of flexure beam assemblies that are arranged in a specified configuration in the interleaver so as to constrain movement of the interleaver in specified directions when a motional force is imposed on it. In brief, upon application of the motional force, the flexures constrain motion of the interleaver, and the transducer attached to the interleaver, in desired directions with respect to the magnetic medium surface.

In one embodiment, the motional force is provided by one or more motor assemblies positioned in the interleaver and/or slider body. The motor assemblies, which employ electromagnetic attraction to move the interleaver assembly, also include a hard magnetic material, such as a ferromagnetic substance, that maintains the interleaver assembly, and hence the transducer, in a predetermined nominal position when the electromagnetic component of the motor assembly is powered off. This further reduces the amount of energy required to provide the necessary motional force.

In another embodiment, the motional force to move the interleaver assembly using the plurality of flexure beams is provided by electrostatic structures. In detail, rigid cantilevered beams containing static electrical charges are interposed between stiff flexure beams of the flexure beam assemblies. When motion is desired, an electrical signal is imposed on the stiff flexure beams, which causes interaction with the charged cantilevered beams, thereby creating the desired motional force. In another embodiment, the stiff flexure beams contain the static electrical charges and, when motion is desired, an electrical signal is imposed on the cantilevered beams to interact with the charged, stiff flexure beams and provide the motional force.

In one embodiment, piezoelectric structures are alternatively used to provide the motional force for moving the interleaver assembly. In brief, the body of the interleaver assembly includes a plurality of embedded piezoelectric elements. When transducer motion is desired, an electrical signal is imposed on one or more of the piezoelectric elements, which causes the piezoelectric element or elements to slightly deform, causing corresponding deformation of the interleaver assembly main body. The transducer, being attached to the main body of the interleaver assembly, is thus moved as well.

In other embodiments, methods are described for preparing, manufacturing, and optimizing the operation of a recording head having the interleaver assembly design described above.

In addition, certain structural configurations between the slider body and the interleaver assembly of the bi-directional recording head are disclosed, to provide desired qualities for the head. Among these is the use of a stepped surface defined on a portion of the interleaver assembly that faces the slider body to enable improved transducer movement.

Additional features and advantages of the invention will be set forth in the description which follows, and in part will be obvious from the description, or may be learned by the practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth hereinafter.

BRIEF DESCRIPTION OF THE DRAWINGS

To further clarify the above and other advantages and features of the present invention, a more particular description of the invention will be rendered by reference to specific embodiments thereof that are illustrated in the appended drawings. It is appreciated that these drawings depict only typical embodiments of the invention and are therefore not to be considered limiting of its scope. The invention will be described and explained with additional specificity and detail through the use of the accompanying drawings in which:

FIG. 5a is a front view of an interleaver assembly according to one embodiment;

FIG. 5b is a top view of the interleaver assembly of FIG. 5a;

FIG. 5c is a cross sectional view of the interleaver assembly taken along the line 5c-5c of FIG. 5a;

FIG. 5d is close-up view of a portion of a flexure assembly taken about line 5d of FIG. 5c;

FIG. 15b is an exploded view of the recording head of FIG. 15a;

DETAILED DESCRIPTION

Reference will now be made to figures wherein like structures will be provided with like reference designations. It is understood that the drawings are diagrammatic and schematic representations of presently preferred embodiments of the invention, and are not limiting of the present invention nor are they necessarily drawn to scale.

FIGS. 1-21 depict various features of embodiments of the present invention, which is generally directed to a recording head that uses various methods of actuation to move a transducer with respect to a magnetic medium, such as a rotating disk, in a magnetic storage device. Examples of magnetic storage devices can include a hard disk drive used in one of a variety of electronic products. In particular, structures and methods are disclosed herein particularly relate to a recording head having an integrated, bi-directional micropositioner. The micropositioner is configured to be selectively moved in two orthogonal directions with respect to the surface of the magnetic medium, thereby enabling greater precision in positioning a transducer located in the micropositioner near the magnetic medium surface.

Various aspects regarding the structure, calibration, and operation of recording heads having an integrated micropositioner are included in U.S. patent application Ser. No. 10/342,920, filed Jan. 13, 2003, entitled "Integrated Bidirectional Recording Head Micropositioner for Magnetic Storage Devices" ("the '920 application"); U.S. patent application Ser. No. 10/342,615, filed Jan. 13, 2003, entitled "High Sustained Data Rate Storage Devices Having Microactuator" ("the '615 application"); U.S. patent application Ser. No. 10/775,406, filed Feb. 9, 2004, entitled "Method of Calibrating Magnetic Storage Medium Bi-Directional Recording Head" ("the '406 application"); U.S. patent application Ser. No. 10/728,561, filed Dec. 5, 2003, entitled "Self-Servo Writing Using Recording Head Micropositioner" ("the '561 application"); U.S. patent application Ser. No. 10/794,482, filed Mar. 5, 2004, entitled "Integrated Recording Head Micropositioner Using Off-Axis Flexure Bending" ("the '482 application"); and U.S. patent application Ser. No. 10/818,641, filed Apr. 5, 2004, entitled "Bidirectional Micropositioner Recording Head for a Magnetic Storage Device" ("the '641 application"). Each of these applications is incorporated herein by reference in its entirety.

Figure 1:
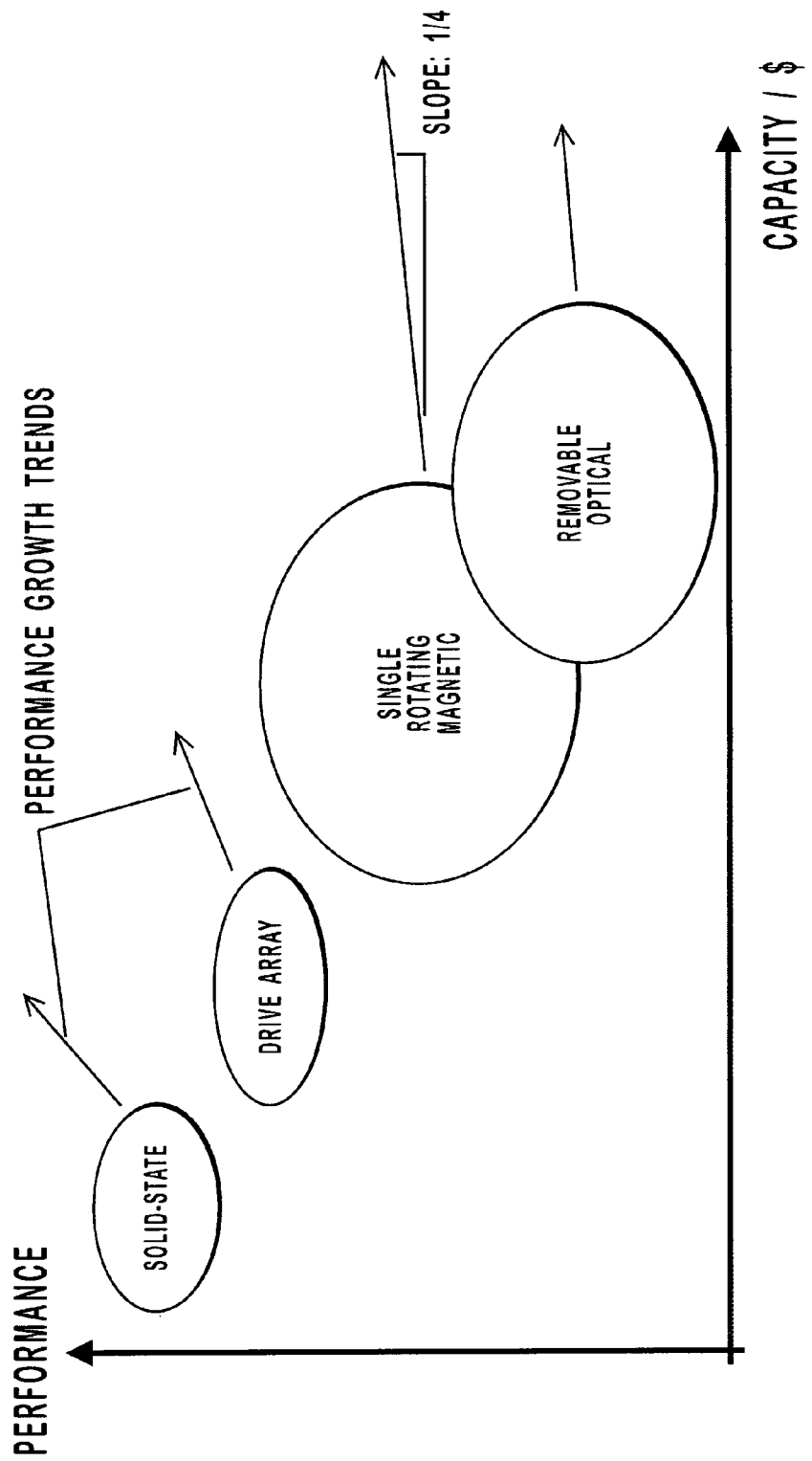
FIG. 1 is a graph that depicts relative cost and performance values of conventional data storage device technologies.
Figure 2:
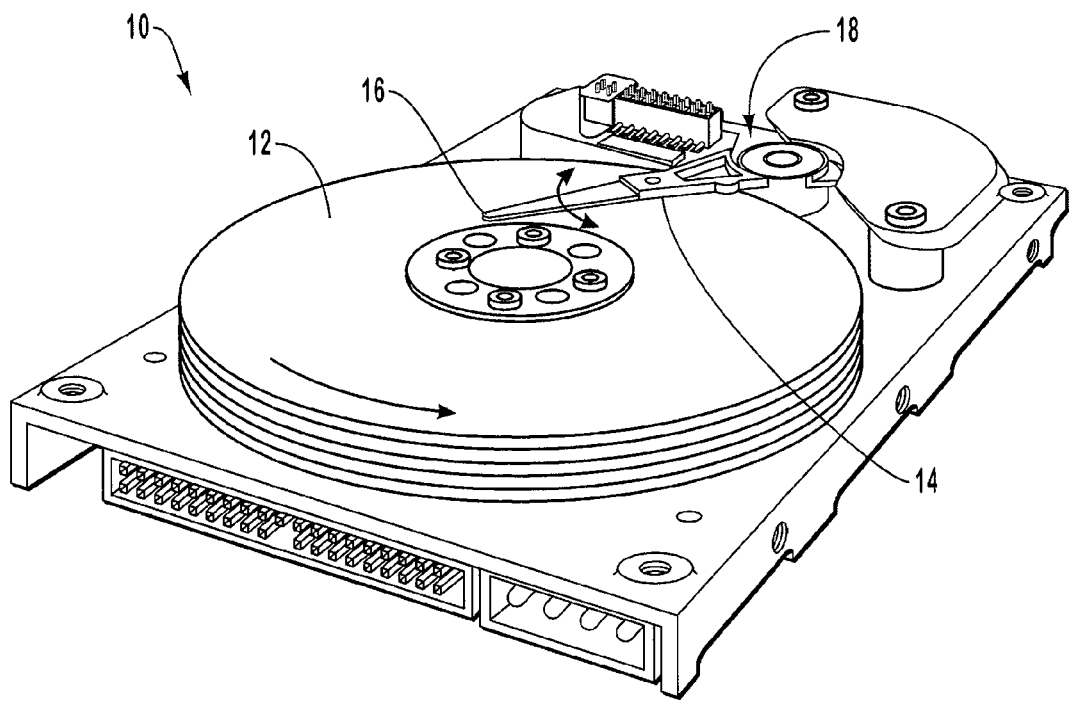
FIG. 2 is a perspective view of a conventional disk drive and head gimbal assembly.
Figure 3:
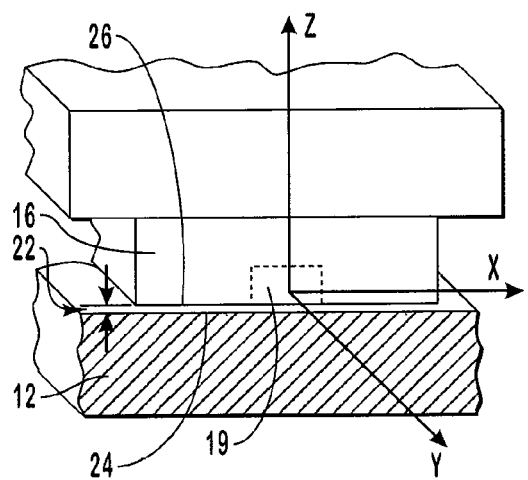
FIG. 3 is a perspective view of a recording head/magnetic storage medium interface of a conventional disk drive.
Figure 4A:
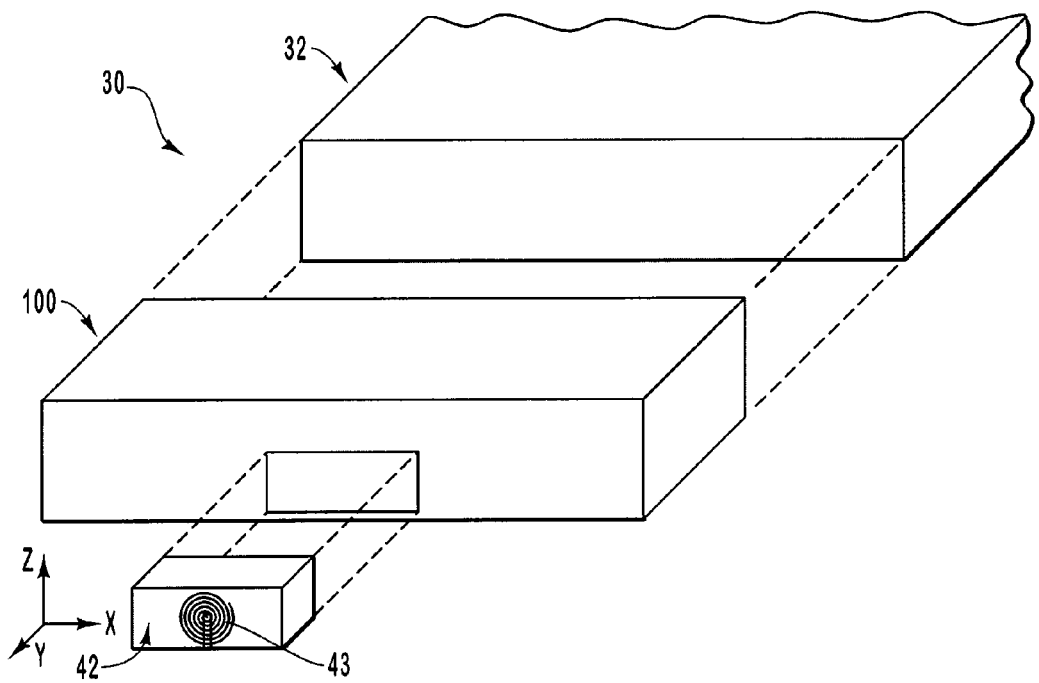
FIG. 4a is a simplified, exploded view of a portion of a recording head including a slider body, an interleaver assembly, and a transducer body, according to one embodiment.
Figure 4B:
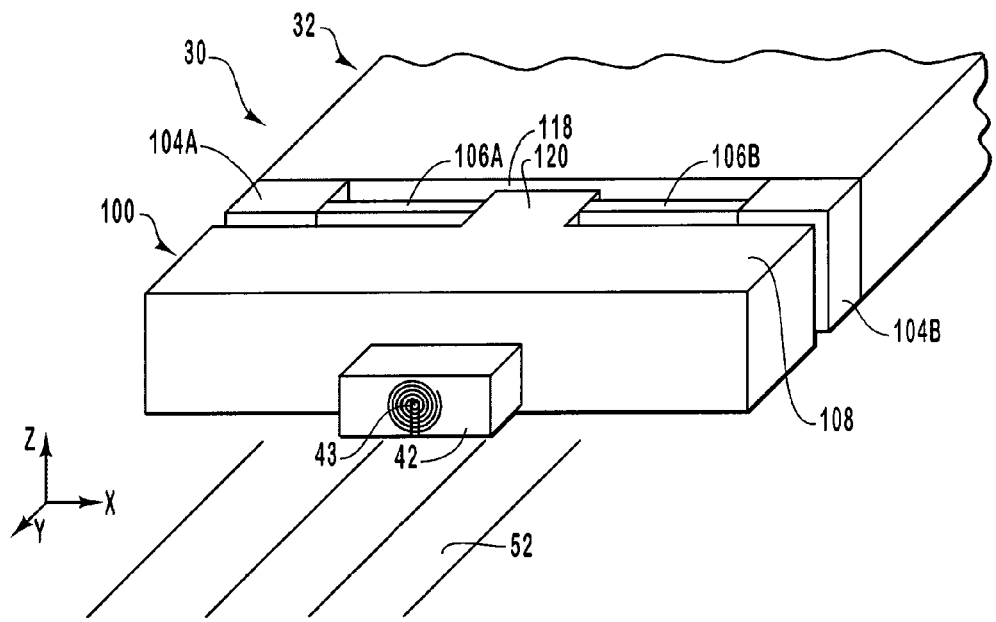
FIG. 4b is an assembled perspective view of a recording head using the components shown in FIG. 4a, according to one embodiment.

While FIGS. 2 and 3 illustrate conventional disk drives, these figures set forth a convention regarding a frame of reference that is useful in describing the methods of positioning and calibrating the transducers of the recording heads. As shown in FIG. 2, a rotating magnetic storage medium 12 rotates counterclockwise, such that elements on the storage medium that encode individual bits of data travel under the recording head 16 in a direction that is substantially parallel to the longitudinal axis of the arm of the head/gimbal assembly ("HGA") 14. In other words, a particular track of the magnetic storage medium 12, which is concentric with the circumference of the magnetic storage medium, is substantially tangent to the longitudinal axis of the HGA 14 when the track is positioned under recording head 16. This motion of the magnetic storage medium 12 with respect to the HGA 14 defines a trailing edge or surface of the recording head 16 that is distal from the axis of rotation of the HGA 14.

FIG. 3 is a perspective view of the recording head, and shows an elevation of the trailing surface of the recording head 16. In FIG. 3, the motion of the illustrated portion of the magnetic storage medium 12 during operation is generally in the y direction, while the orientation of the data tracks of this portion of the magnetic storage medium is likewise substantially in the y direction. As shown in FIG. 3, the z direction is defined to be perpendicular to the surface of the magnetic storage medium 12. The x direction is defined to be substantially perpendicular to or lateral with respect to the orientation of the tracks. In other words, motion in the x direction can cause the transducer to be laterally moved between tracks or to be centered over a track; thus movement in the x direction is known as track-to-track movement. Because of the small angles involved, the motion of the transducer can be considered to be a translation in the x direction, regardless of whether the motion is a result of the actuation of the micropositioner integrated into the slider body of the recording head 16 or motion associated with the rotation of the HGA 14 about the axis of rotation of the HGA 14. The y axis is defined to be perpendicular to both the x and z axes as shown in FIG. 3.

FIG. 3 also illustrates a fly height 22, which is defined to be the distance in the z direction between the surface 24 of the magnetic storage medium 12 and the adjacent bottom, or air bearing, surface 26 of the recording head transducer. FIG. 3 illustrates the general position of a transducer in region 19 and the relationship thereof to the x, y and z axes and the fly height 22.

The definitions and descriptions of track-to-track, fly height, and related concepts as described above are applied in the following discussion in describing various features of embodiments of the present invention. Note that the principles of the present invention to be described below can be reliably used with existing recording media as well as with higher density recording media that will be developed in the future. Also, the discussion to follow focuses on the interaction of a recording head with a top surface of a magnetic storage medium. In other embodiments, however, it should be appreciated that magnetic storage devices having a plurality of recording heads operating in conjunction with a plurality of magnetic storage medium surfaces can also benefit from the present invention. Thus, the description contained herein is merely illustrative of the broader concepts encompassed by the present invention, and is not meant to limit the present invention in any way.

Reference is now made to FIGS. 2-7c and 8, which show general representations of a micropositioning recording head according to various embodiments of the present invention. As such, the recording head to be described is merely exemplary of those recording heads that fit within the description herein, and is not meant to confine the invention to only the illustrated implementations. In particular, a recording head, generally depicted at 30, forms a component of a magnetic storage device, such as a hard disk drive (not shown) for use in reading and writing data to a magnetic medium (not shown here). The recording head 30 of the present embodiment generally includes a slider body 32, a transducer body 42, and an interleaver assembly 100. These components cooperate in providing bi-directional actuation of the recording head, and more particularly the transducer body, with respect to a surface 52 of a magnetic storage medium, as shown, for example, in FIG. 8.

The interleaver assembly 100 is interposed between the slider body 32 and the transducer body 42 and serves as a means by which the transducer 43 can be bi-directionally moved with respect to the magnetic storage medium surface 52. As such, the interleaver assembly 100 of the present invention generally includes attachment 104A and 104B regions that rigidly connect with the slider body 32, a separate main body portion 108, and flexure assemblies 106A and 106B that enable the main body portion to move with respect to the attachment regions.

With continuing reference to FIGS. 2-7c and 8, reference is now made to FIGS. 5a-5e, which together depict additional details regarding the recording head 30 and the interleaver assembly 100, according to one embodiment. As mentioned, the interleaver assembly 100 includes the first and second interconnect regions 104A and 104B, the first and second flexure assemblies 106A and 106B, and the body portion 108. The body portion 108 is indirectly attached to each interconnect regions 104A and 104B via the first and second flexure assemblies 106A and 106B. As such, the first flexure assembly 106A is attached to and interposed between the first interconnect region 104A and a central portion 120 of the body portion 108, while the second flexure assembly 106B is attached to and interposed between the second interconnect region 104B and the central portion 120. According to one embodiment, the flexure assemblies 106A and 106B include a plurality of resilient flexure beams 117, as shown in FIGS. 5a-5d, that can deform when subjected to a sufficient motional force. The flexure beams 117 of each flexure assembly 106A and 106B are configured such that their deformation causes movement of the body portion 108 and transducer 43 in specified directions with respect to the magnetic medium surface 52. In one embodiment, flexure of the flexure assemblies 106A and 106B results in selective transducer motion in a vertical, fly height direction, which corresponds to movement along the z-axis shown in FIG. 3, and in a horizontal, track-to-track direction, which corresponds to movement along the x-axis. Further details regarding the structure and operation of the flexure assemblies 106A and 106B can be found in the '482 application.

Figure 5E:
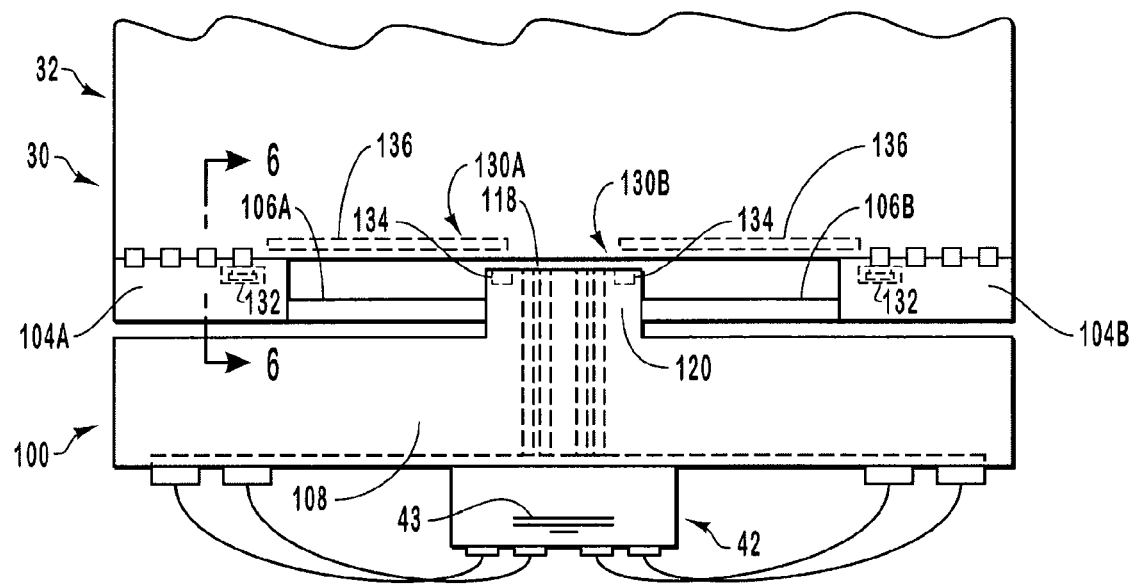
FIG. 5e is a top view of the recording head of FIG. 4b, depicting additional features thereof.
Figure 6:
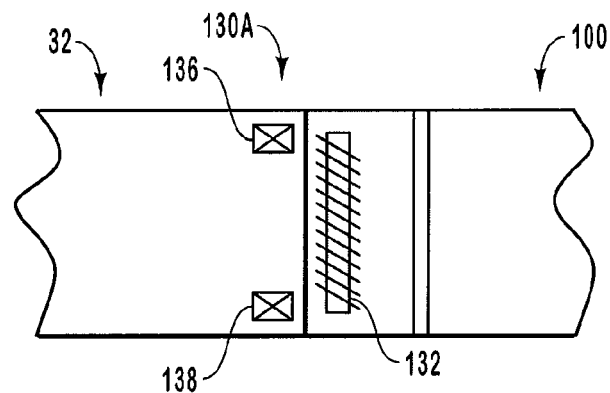
FIG. 6 is a top view of an interleaver assembly configured according to one embodiment of the present invention.

A number of configurations can be employed in the recording head 30 to provide the motional force described above for selectively flexing the flexure assemblies 106A and 106B to achieve corresponding micropositioning movement of the transducer 43. One configuration employs motor assemblies 130A and 130B, various components of which are shown in FIGS. 5a-5 e and FIG. 6. In brief, each motor assembly 130A and 130B includes a magnetic flux source 132 and an inner closure bar 134 positioned in the interconnect regions 104A and 104B, respectively, of the interleaver assembly 100, as well as a top closure bar 136 and bottom closure bar 138 positioned in the slider body 32. The components of each motor assembly 130A and 130B are positioned proximate one another, as shown in FIG. 5e, in order to form an electromagnetic loop when one or both motor assemblies are selectively energized, thereby providing a desired motional force for flexing of the flexure assemblies 117, as briefly explained further below, and as discussed in greater depth in the '482 application.

Figure 7A:
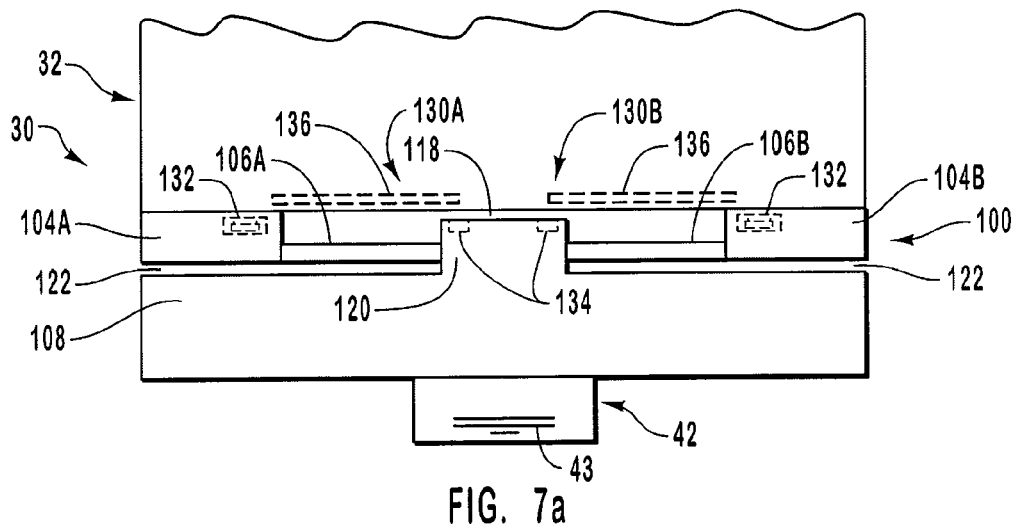
FIG. 7a is a simplified top view of the recording head of FIG. 4b in a first state, wherein flexures of the interleaver assembly are in an un-flexed position.
Figure 7B:
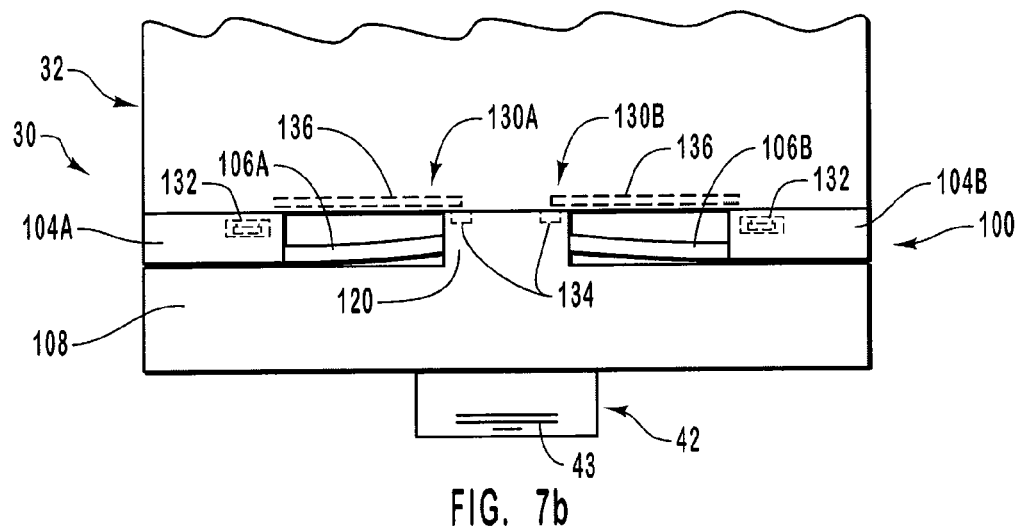
FIG. 7b is a simplified top view of the recording head of FIG. 4b in a second state, wherein the flexures of the interleaver assembly are in a flexed position.
Figure 7C:
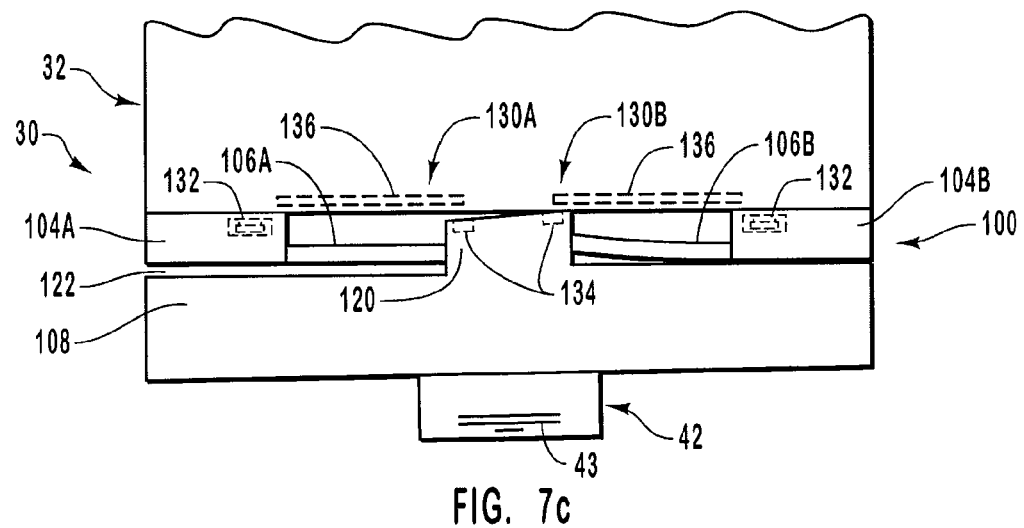
FIG. 7c is a simplified top view of the recording head of FIG. 4b in another state, wherein only a portion of the flexures of the interleaver assembly is in a flexed position.

Reference is now made to FIGS. 7a-7c in describing various details regarding the general operation of the interleaver assembly 100. As mentioned, the body portion 108 of the interleaver assembly 100 is indirectly attached to each interconnect region 104A and 104B via the flexure assemblies 106A and 106B. The flexure assemblies 106A and 106B include the plurality of resilient flexure beams 117, as shown in FIGS. 5a, 5c, and 5d, that can deform when subjected to a sufficient force provided by the motor assemblies 130A and 130B or other suitable component. For example, FIG. 7a shows the interleaver assembly 100 in a non-actuated state, wherein a gap 118 exists between the central portion 120 and a corresponding portion of the slider body 32. In this state, channel gaps 122 also exist between each of the interconnect regions 104A and 104B and the body portion 108. In contrast, FIG. 7b shows the interleaver assembly 100 in an actuated state, wherein the motor assemblies 130A and 130B have been activated to produce a motional force via electromagnetic attraction to cause deformation of both flexure assemblies 106A and 106B. When such deformation of the flexure beams 117 occurs, the size of the gap 118 is reduced until contact is made between the central portion 120 and the corresponding portion of the slider body 32. In turn, this causes movement of the body portion 108 in a specified direction according to the configuration of the flexure beams 117. Correspondingly, because of its attachment to the body portion 108, the transducer body 42 is also generally moved in the same direction as the body portion 108, this motion being determined by the configuration of the flexure beams 117. Note that both channel gaps 122 are eliminated in this state.

As noted above, the flexure beams 117 of each flexure assembly 106A and 106B are configured such that their deformation causes movement of the body portion 108 and transducer 43 in a specified direction with respect to the magnetic medium surface 52. In one embodiment, deformation of the flexure assemblies 106A and 106B can result in transducer 43 motion in a vertical fly height direction and/or in a horizontal, track-to-track direction.

Note that the flexure beams 117 are resilient such that, when the motional force provided by the motor assemblies 130A and 130B is removed, the flexure beams return to their original position, thereby causing the body portion to return to its original position, as in FIG. 7a.

FIG. 7c shows partial actuation of the interleaver 100, wherein only the second motor assembly 130B is actuated to provide a partial motional force. This causes the central portion 120 to contact the corresponding portion of the slider body 32 at an angle, thereby only partly closing the gap 118. This further illustrates one principle of embodiments of the invention, wherein motion of the transducer 43 can be affected in one or more of various ways according to the configuration and/or actuation of the interleaver 100.

Figure 8:
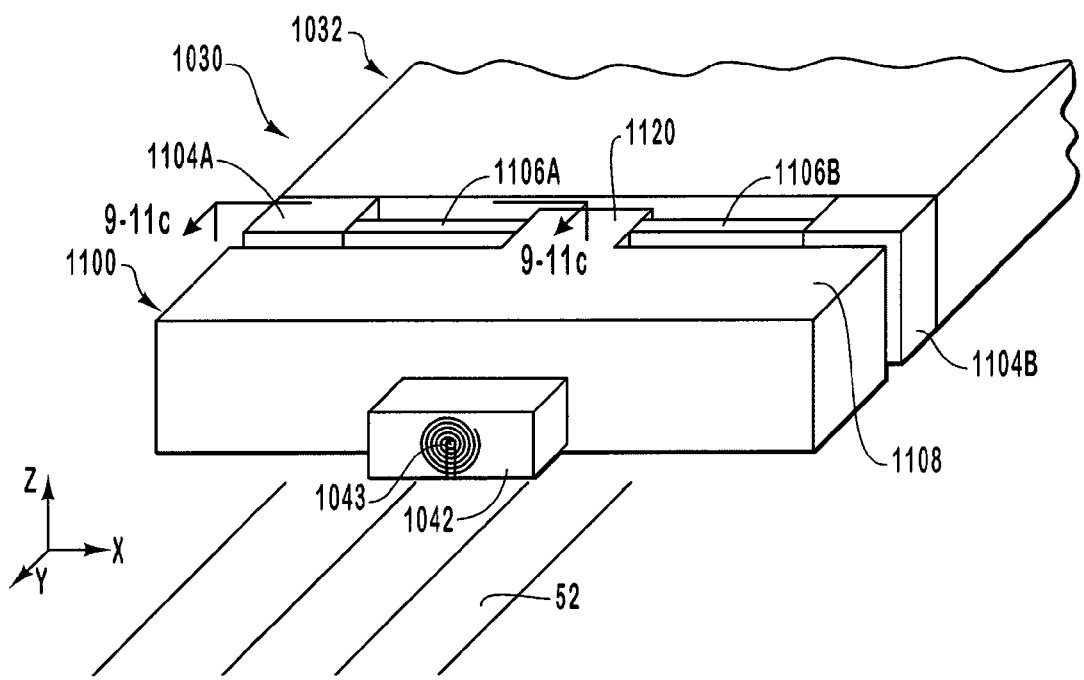
FIG. 8 is a simplified perspective view of a recording head made in accordance with one embodiment of the present invention.
Figure 9:
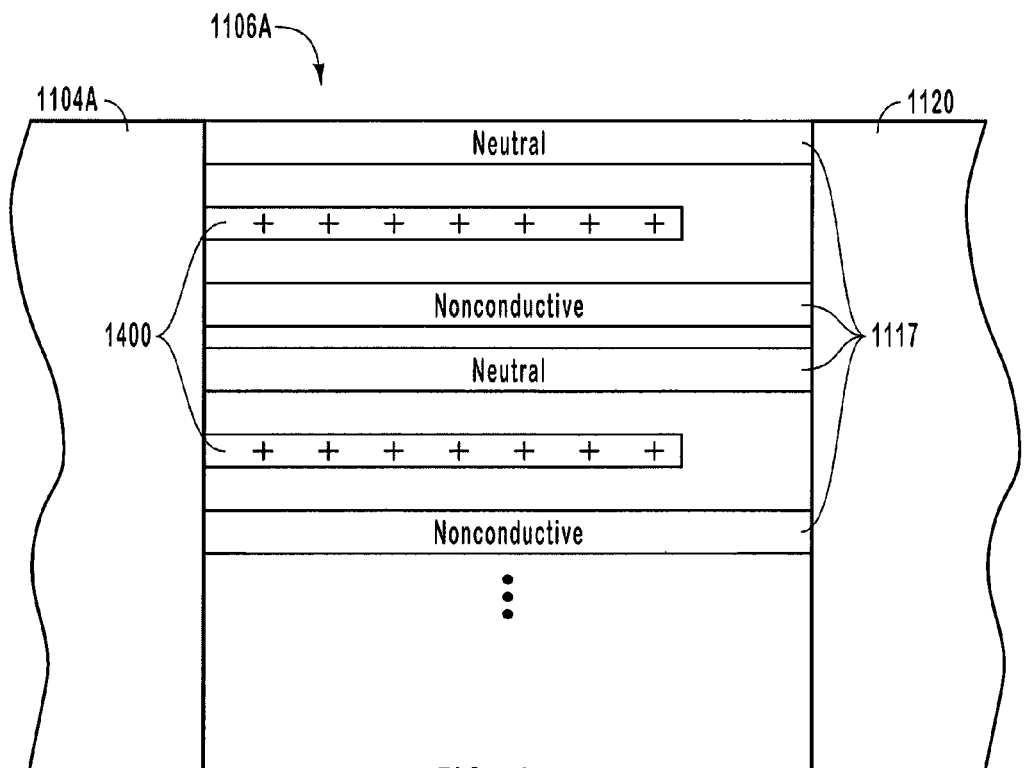
FIG. 9 is a simplified front view of a flexure region of the interleaver assembly depicted in FIG. 8, showing flexure beams and electrostatically charged cantilevered beams in an unactuated state, according to one embodiment.

Reference is now made to FIGS. 8 and 9, which depict portions of a recording head configured in accordance with one embodiment of the present invention. As already discussed, various configurations can be employed to enable selective flexing of the flexure assembly of recording heads discussed herein. Indeed, as illustrated in FIGS. 5a-5 e, motor assemblies 130A and 130B are employed to provide a motional force sufficient to enable selective flexing of the flexure assemblies 106A and 106B. In contrast, FIGS. 8 and 9 depict another configuration that can be employed for beam flexure.

In detail, FIG. 8 shows a recording head, generally designated at 1030, including a slider body 1032, a transducer body 1042 housing a transducer 1043, and an interleaver assembly 1100 interconnecting the slider body with the transducer body 1042. The interleaver assembly 1100 further includes interconnect regions 1104A and 1104B that are connected to a central portion 1120 thereof via flexure assemblies 1106A and 1106B.

FIG. 9 is a view of a portion of the interleaver assembly 1100, as viewed along the line 9-11c-9-11c of FIG. 8. Though FIG. 9 explicitly shows a portion of only the flexure assembly 1106A, the structure depicted is representative of the entirety of the flexure assembly 1106A and the flexure assembly 1106B as well. As illustrated, the flexure assemblies 1106A and 1106B are oriented within a plane that is orthogonal to the surface of a magnetic medium, such as the magnetic medium surface 52 of FIG. 8 and each includes a plurality of flexure beams 1117 (see FIG. 9) extending between a respective one of the interconnect regions 1104A, 1104B and the central portion 1120. In addition, each flexure assembly 1106A and 1106B includes a plurality of cantilevered beams 1400 that also extend between one of the interconnect regions 1104A, 1104B and the central portion 1120.

As in previous embodiments, the flexure beams 1117 extend between and attach to both a respective one of the interconnect regions 1104A, 1104B and the central portion 1120. In contrast, the cantilevered beams 1400 are each attached only to a respective one of the interconnect regions 1104A, 1104B and extend toward, but do not attach to, the central portion 1120. In other embodiments, the cantilevered beams 1400 can alternatively attach to the central portion 1120 and extend toward one of the interconnect regions 1104A, 1104B, or the cantilevered beams 1400 can include some beams that attach to the central portion and others that attach to the interconnect regions.

While the flexure beams 1117 shown in FIG. 9 are resilient such that they are able to deform, the cantilevered beams 1400 are constructed to have a relatively greater stiffness than the flexure beams 1117. This configuration enables operation of the flexure assemblies 1106A and 1106B, to be described below.

In one embodiment, each of the flexure assemblies 1106A and 1106B is configured such that there are two or more flexure beams 1117 positioned between each cantilevered beam 1400, as shown in FIG. 9. Further, the various beams of the flexure assemblies 1106A and 1106B are configured to assume a specified electrical state during operation of the recording head 1030 in order to achieve beam flexure and corresponding transducer movement. In detail, each flexure beam 1117 and cantilevered beam 1400 is configured to selectively receive a static electric charge or, alternatively, no charge. For example, FIG. 9 depicts a steady state condition, wherein each flexure beam 1117 is in a neutral, no charge state, and each cantilevered beam 1400 has a positive static charge. In this steady state condition, no flexure of the flexure beams 1117 takes place. Although FIG. 9 displays a positive static charge associated with the cantilevered beams 1400, a negative charge can alternatively be applied thereto.

Figure 10:
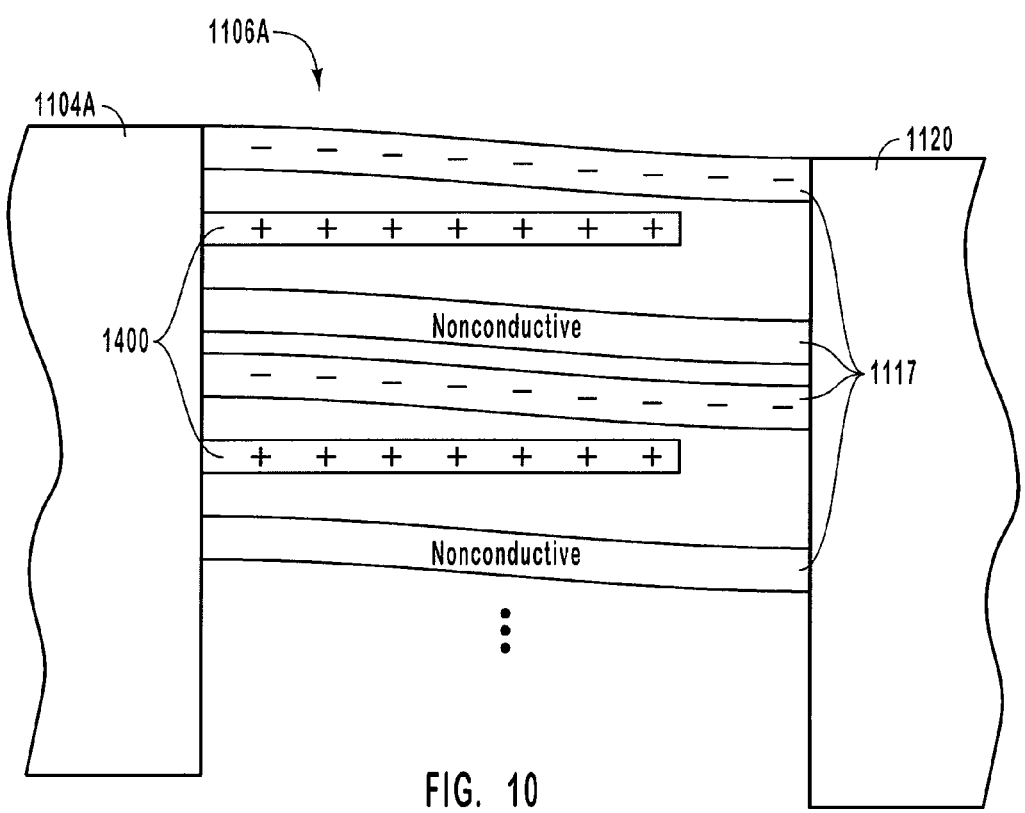
FIG. 10 is a simplified front view of the flexure region of FIG. 9, showing the flexure beams in an actuated state.

Together with reference to FIGS. 8 and 9, reference is now made to FIG. 10. As generally described further above, flexure of the flexure beams 1117 occurs when a sufficient motional force is applied to the beams. In the illustrated embodiment, the motional force is provided by electrostatic interaction between the various beams of the flexure assemblies 1106A and 1106B. When beam flexure is desired, the cantilevered beams 1400 of one or both flexure assemblies 1106A, 1106B are electrostatically charged with a specified polarity, in this case, positive. Note that the cantilevered beams 1400 can be maintained with a specified electrostatic charge, even when beam flexure is not desired. Selected flexure beams 1117 are then charged to a polarity opposite that of the cantilevered beams 1400, in this case, negative. This opposite polarity charge in the illustrated embodiment is placed on each flexure beam 1117 that is adjacent to and directly above a corresponding cantilevered beam 1400, as shown in FIG. 10. This causes each charged flexure beam 1117 to be attracted to the cantilevered beam 400 directly adjacent thereto, resulting in flexure of each flexure beam 1117. Such flexure in turn results in movement of the body portion 1108, as detailed further below. The extent of flexure beam deformation, and the corresponding body portion movement, is dependent on the magnitude of the charge that is induced on the flexure beams 1117, i.e., the greater the magnitude of the charge, the more body portion movement that results.

Note that, in the frame of reference of FIGS. 9 and 10, only the flexure beams 1117 that are adjacent to and directly above a corresponding cantilevered beam 1400 are charged in the manner described above. This can be done by selectively charging only those flexure beams 1117 that are properly positioned, or by configuring those beams that are not to be charged as to be electrically non-conductive. This ensures that each charged flexure beam 1117 will be properly attracted to the corresponding cantilevered beam 1400 adjacent thereto.

Figure 11A:
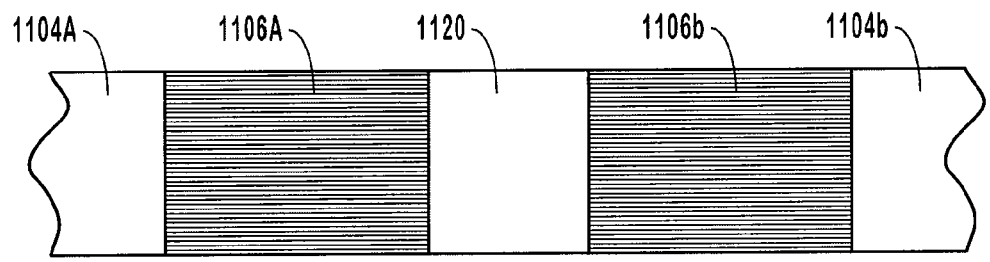
FIG. 11a is a simplified front view of an interleaver assembly having flexure regions as shown in FIG. 9, wherein the flexure beams are in a first, un-flexed state.
Figure 11B:
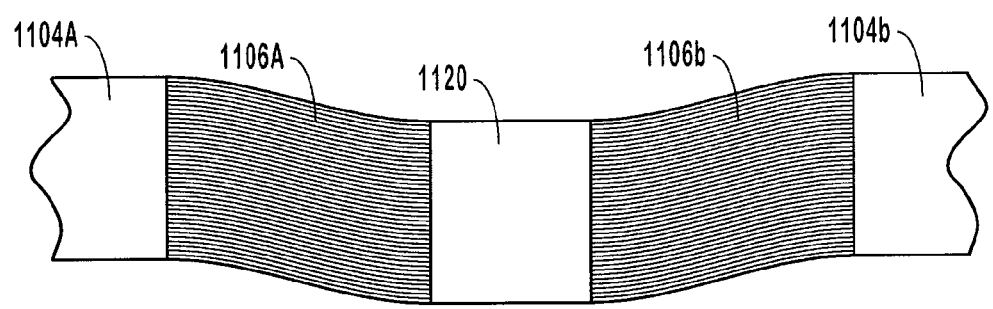
FIG. 11b is a simplified front view of the interleaver assembly of FIG. 11a, showing the flexure beams in a second, flexed state.
Figure 11C:
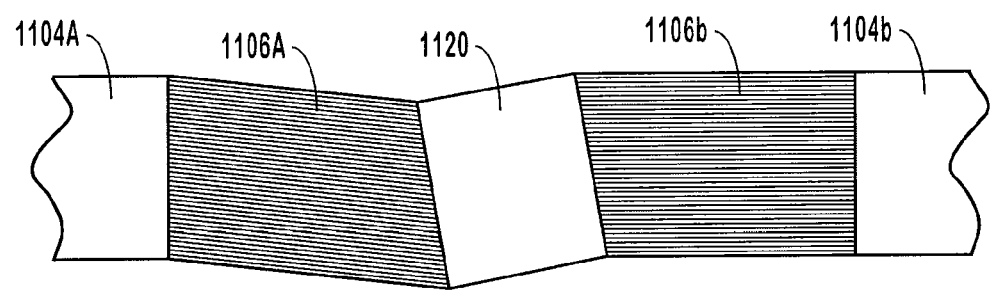
FIG. 11c is a simplified front view of the interleaver assembly of FIG. 11a, showing the flexure beams in a third, partially flexed state.

Reference is now made to FIGS. 11a-11c in describing various details regarding operation of the interleaver assembly 1100 of the recording head 1030, shown in FIG. 8 using an electrostatic motional forces for transducer movement in the fly height and track-to-track directions. As mentioned, the transducer 1043 is positioned in the transducer body 1042, which in turn is directly attached to the body portion 1108 of the interleaver assembly 1100. Also, the center portion of 1120 of the body portion 1108 is attached to the flexure assemblies 1106A and 1106B. Thus, movement of the center portion 1120 in response to flexure of the flexure assemblies 1106A, 1106B causes corresponding movement of the body portion 1108 and the transducer body 1042, and hence, the transducer 1043. FIGS. 11a-11c illustrate the details of flexure beam movement in accordance with the embodiment as illustrated in FIGS. 8-10.

In detail, FIG. 11a shows the center section 1120 and flexure assemblies 1106A and 1106B of the interleaver assembly 1100 in a first, non-actuated state, wherein the flexure assemblies 1106A and 1106B are un-deflected. In contrast, FIG. 11b shows the center section 1120 and flexure assemblies 1106A and 1106B of the interleaver assembly 1100 in a second, actuated state, wherein an electrical charge is imposed on the flexure assemblies 1106A and 1106B, as described above, to produce a motional force and cause deformation of both flexure assemblies 1106A and 1106B. This in turn causes the center section 1120, and thus the body portion 1108, to be moved in the fly height direction toward the magnetic medium surface 52. Correspondingly, because of its attachment to the body portion 1108, the transducer body 1042 is also generally moved in the same fly height direction as the body portion 1108, thereby desirably adjusting the position of the transducer 1043 in the fly height direction.

Note that the flexure beams 1117 are resilient such that, when the motional force provided by the electrical signal on the flexure beams is removed, the flexure beams return to their original position, thereby causing the body portion 1108 to return to its original position, as shown in FIG. 11a.

FIG. 11c depicts a partial actuation of the flexure assemblies 1106A and 1106B of the interleaver assembly 1100, wherein an electrical charge is imposed only on the first flexure assembly 1106A. This actuation causes flexure of only the flexure assembly 1106A, which in turn results in the deflection of only a portion of the center section 1120 of the interleaver assembly 1100. The motion of the center portion 1120 is translated through the body portion 1108 (FIG. 8) and the transducer body 1042 to the transducer 1043. Movement of the transducer 1043 in a track-to-track direction results, as may be desired during operation of the recording head 1030. More generally, various charge combinations can be imposed on the flexures 1117 of each flexure assembly 1106A and 1106B to generate a combination of transducer fly height and track-to-track motions.

As shown in the present embodiment, gaps are required between the flexure beams 1117 and cantilevered beams 1400 to achieve transducer motion in the fly height direction. As such, this approach only produces forces of approximately 0.2-0.4 mN. Because of these lower forces, resonant frequencies for interleaver assemblies employing electrostatic charges are approximately 10 kHz.

Figure 12:
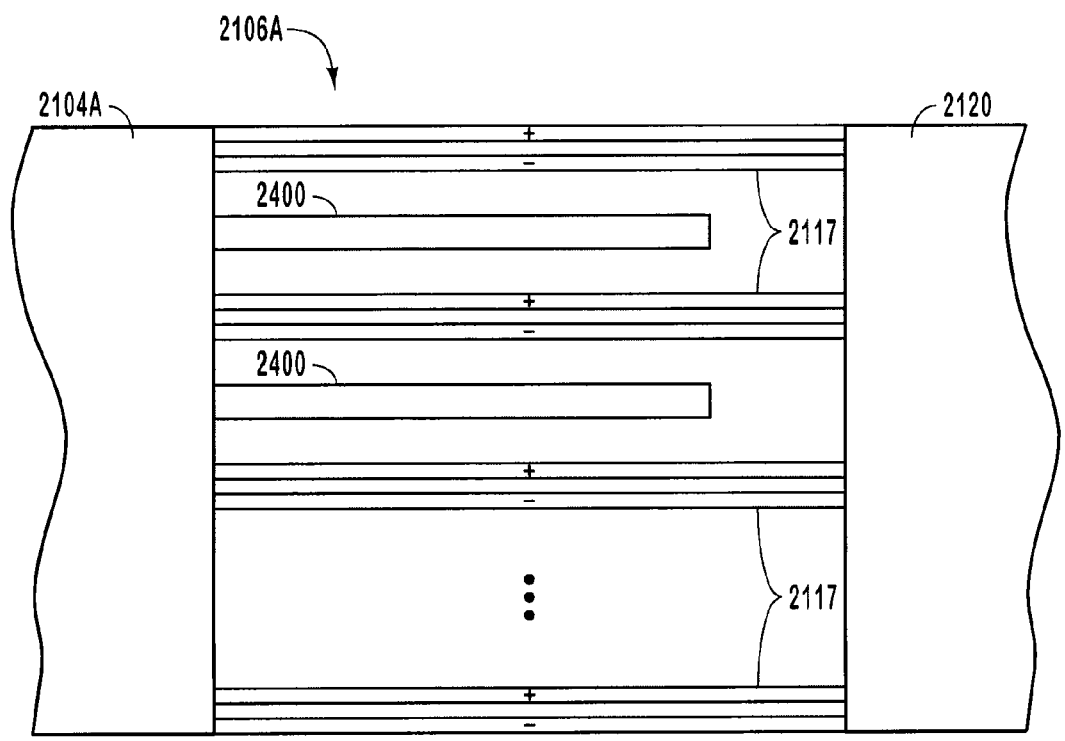
FIG. 12 is a simplified front view of a flexure region of an interleaver assembly, containing flexure beams and electrostatically cantilevered beams in an unactuated state, according to one embodiment.

Reference is now made to FIG. 12, which depicts another embodiment of an electrostatic charge-driven interleaver assembly. As in the previous embodiment, the interleaver assembly employs electrostatic charges to cause deflection of a plurality of flexure beams 2117 located in two flexure assemblies, such as the flexure assembly 2106A shown here, that extend between and connect with an interconnect region 2104A and a central portion 2120 of the interleaver assembly.

Additionally, a plurality of cantilevered beams 2400 are interposed between the flexure beams 2117, the cantilevered beams 2400 being connected to the interconnect region 2104A such that they extend toward, but do not attach to, the central portion 2120, as before.

In contrast to the previous embodiment, each flexure assembly, such as the flexure assembly 2106A, is configured such that each cantilevered beam 2400 is interposed between adjacent pairs of flexure beams 2117. Each flexure beam 2117 of the pair carries an electrical charge opposite that of the other flexure beam of the pair. In FIG. 12, for instance, each upper flexure beam 2117 carries a positive electrical charge, while the lower beam carries a negative charge. When deflection of the flexure assembly 2106A or its corresponding flexure assembly (not shown) in a particular direction is desired, a charge can be imparted to the various cantilevered beams 2400. In a first state, shown in FIG. 12, the cantilevered beams 2400 carry no charge; thus no deflection of the flexure beams 2117 occurs. In a second, actuated state, the cantilevered beams 2400 can be imparted with a positive charge, which will, in turn, cause adjacent flexure beams having a negative charge to be attracted thereto, resulting in a net deflection of the flexure assembly 2106A and corresponding movement of the central portion 2120 as desired. In yet a third, actuated state, the cantilevered beam 2400 can be imparted with a negative charge, which will result in the adjacent positively charged flexure beams 2117 to be attracted thereto, resulting in a deflection of the flexure assembly 2106A in a direction opposite to the second, actuated state, along with corresponding movement in the direction of the central portion 2120.

Figure 13A:
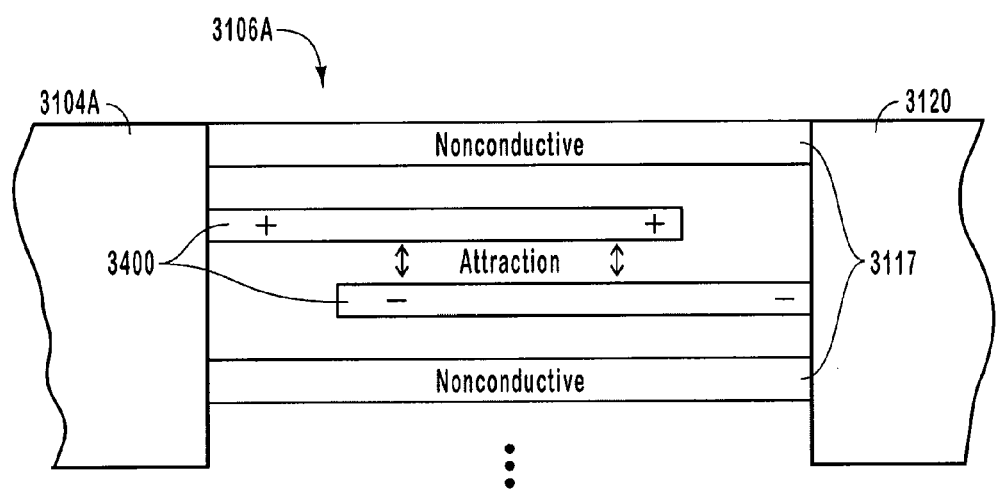
FIG. 13a is a simplified front view of a flexure region of an interleaver assembly, containing flexure beams and electrostatically cantilevered beams, according to another embodiment.
Figure 13B:
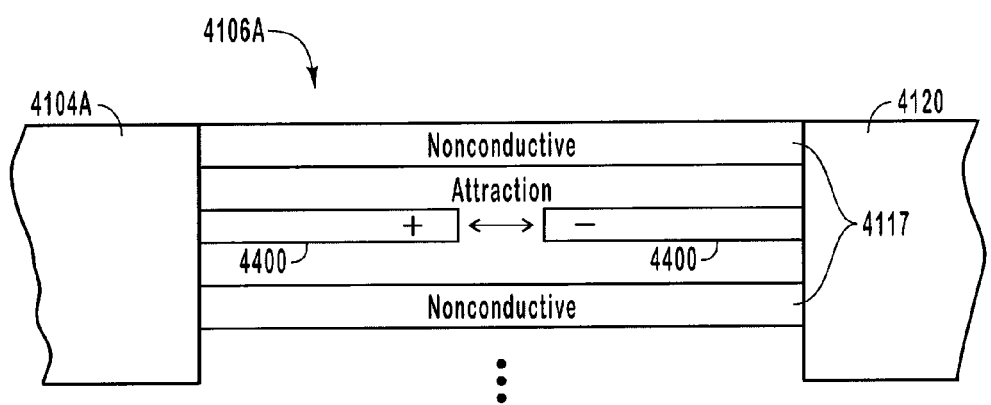
FIG. 13b is a simplified front view of a flexure region of an interleaver assembly, containing flexure beams and electrostatically cantilevered beams, according to yet another embodiment.

Reference is now made to FIGS. 13A and 13B. Deformation of flexure beams of an interleaver assembly made in accordance with principles of the present invention using electrostatic attraction can be configured in other ways from that shown in the previous figures. FIGS. 13A and 13B are examples of such alternative configurations. In particular, FIG. 13A depicts portions of an interleaver assembly, including an interconnect region 3104A interconnected to a central portion 3120, by a flexure assembly 3106A having a plurality of flexure beams 3117 as in previous embodiments. The flexure beams 3117 in the present embodiment are configured as being electrically non-conductive. In addition, cantilevered beams 3400 are shown interposed between the flexure beams 3117 and extend both from the interconnect region 3104A and from the central portion 3120 such that sets of cantilevered beams 3400, one beam extending from the interconnect region and one beam extending from the central portion, are positioned adjacent one another. As before, the cantilevered beams 3400 do not span the entire length between the interconnect region 3104A and the central portion 3120 such that each cantilevered beam 3400 includes one unattached end, as shown in FIG. 13A.

In order to deform the flexure assembly 3106A, opposing static electrical charges can be selectively applied to each beam of the adjacent pairs of cantilevered beams 3400, such as the pair shown in FIG. 13A. Charging of the cantilevered beams 3400 in this manner causes attraction between the two beams such that proper deformation of the flexure assembly 3106A is achieved, which as described before, results in desired movement of the transducer (not shown) in specified fly height and track-to-track motions. As before, though not shown, a corresponding flexure assembly configured like the flexure assembly 3106A, is included on an opposing side of the central portion 3120, in a configuration similar to that shown in FIG. 8.

FIG. 13B depicts yet another embodiment of an interleaver assembly employing electrostatic charges for flexure of a flexure assembly 4106A, as well as a corresponding second flexure assembly (not shown). In detail, the flexure assembly 4106A includes a plurality of flexure beams 4117 extending between and connecting to both an interconnect region 4104A and a central portion 4120. Interposed between the flexure beams 4117 is a plurality of cantilevered beams 4400. As shown in FIG. 13B, pairs of cantilevered beams 4400 are configured such that one cantilevered beam extends from the interconnect region 4104A while an oppositely disposed beam extends from the central portion 4120. Each cantilevered beam 4400 of each beam pair includes an unattached end, the ends of each cantilevered beam being positioned proximate one another. This configuration of the cantilevered beams 4400 enables opposite electrostatic charges to be deposited onto either of the cantilevered beams 4400 of the pair, thereby enabling deformation of the flexure assembly 4106A and corresponding movement of the transducer (not shown), as in previous embodiments.

It should be noted that, in addition to the various embodiments described herein that employ electrostatic charges for deflection of the flexure assemblies, yet other flexure beam and cantilevered beam combinations can be devised in accordance with the principles of the present invention. As such, the embodiments explicitly described here and should not be considered limiting of the scope of the present invention in any way.

Figure 14A:
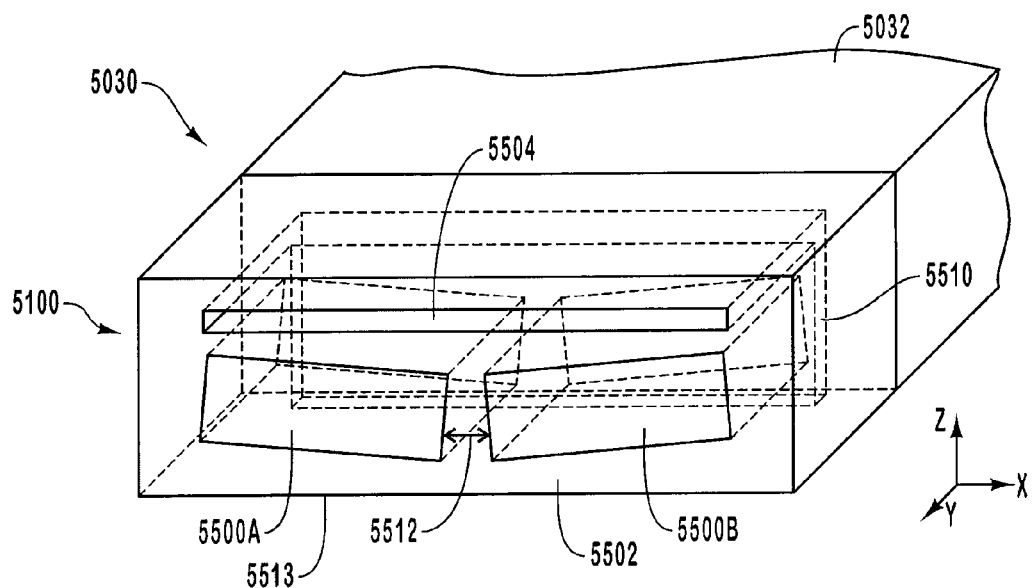
FIG. 14a is a perspective view of an interleaver assembly containing discrete piezoelectric elements in an unactuated state, according to one embodiment.

Reference is now made to FIG. 14a-16c. Deflection of an interleaver assembly in accordance with embodiments of the present invention can also be accomplished employing piezoelectric principles. FIGS. 14a and 14b depict various features of one such device. In particular, a recording head, generally designated at 5030, is shown and includes a slider body 5032, a transducer body 5042 (FIGS. 15a, 15b), and an interleaver assembly 5100 interconnecting the slider body and the transducer body. As in the other embodiments disclosed herein, the interleaver assembly 5100 is electrically connected to the slider body 5032 and the transducer body 5042 so as to enable the transmission of the electrical signals therebetween as necessary for recording head operation.

Figure 15A:
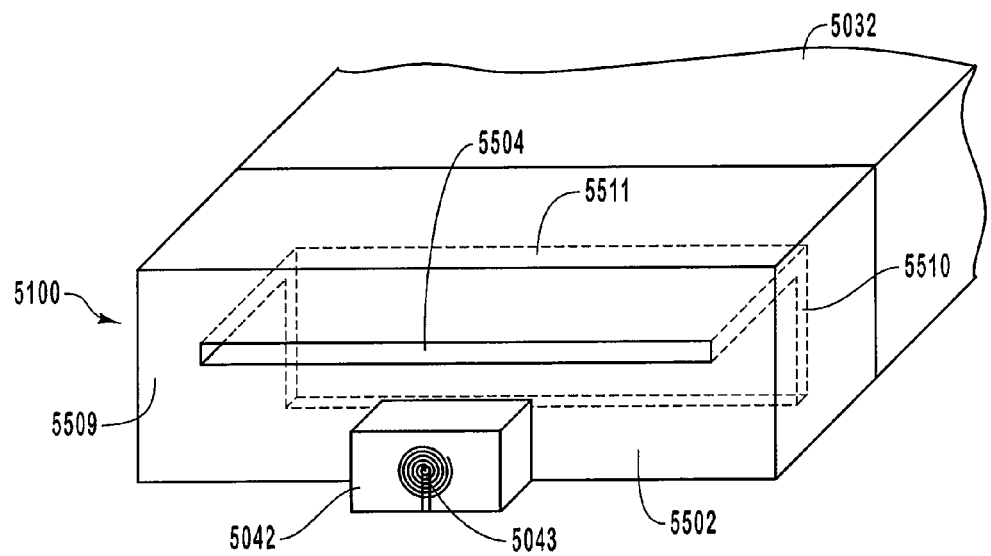
FIG. 15a is a simplified perspective view of an assembled recording head including a slider body, the interleaver assembly of FIG. 14a, and a transducer body, according to one embodiment.
Figure 15B:
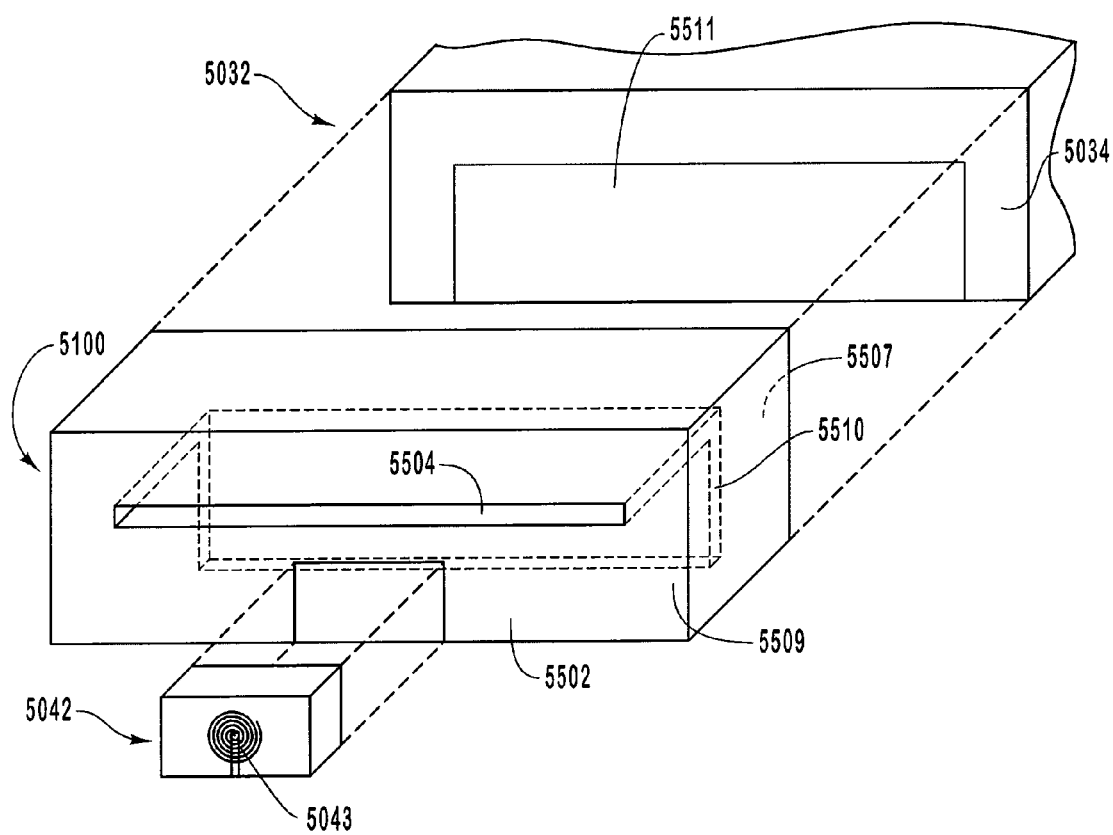

The connection between the interleaver assembly 5100 and the slider body 5032 is such that no physical connection exists between the two components in a region corresponding to an area 5511 located on a face 5034 of the slider body. The area 5511 further corresponds to a first gap 5510 defined on an inner face 5507 of the interleaver assembly 5100. Further, the gap 5510 is in communication with a second gap 504 defined between the interleaver assembly inner face 5507 and a trailing face 5509 such that the two gaps form an L-shaped gap region. The relationship between the two gaps 5504 and 5510 can be more clearly seen in FIGS. 15a and 15b. The lack of physical connection between the slider body 5032 and the interleaver assembly 5100 in the area 5511, together with the gaps 5504 and 5510, enables for selective deformation of the interleaver assembly 5100 to be described below. Again, as shown in FIGS. 15a and b, the transducer body 5042 is attached to the trailing edge 5509 of the interleaver assembly 5100.

Figure 14B:
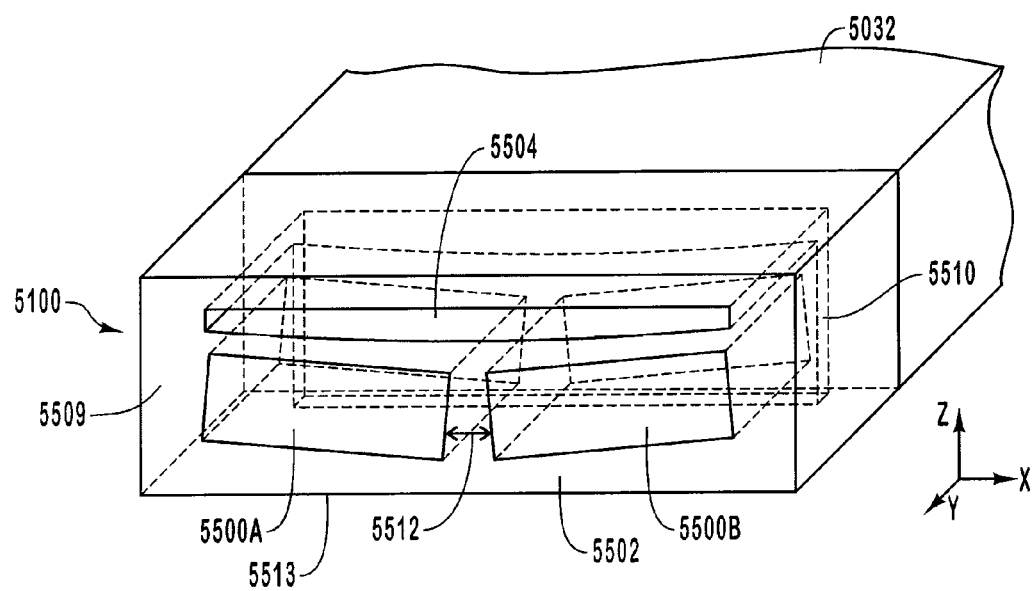
FIG. 14b is a perspective view of the interleaver assembly of FIG. 14a, showing the discrete piezoelectric elements in an actuated state.

As shown in FIGS. 14a and 14b, two piezoelectric elements 5500A and 5500B are positioned within the interleaver assembly 5100 proximate the gaps 5504 and 5510. The piezoelectric elements 5500A and 5500B are positioned in the interleaver assembly 5100 such that they are able to effect deformation of the interleaver assembly, and hence, selective movement of a transducer 5043. As such, each piezoelectric element 5500A and 5500B is positioned in an angled relationship with respect to one another, as viewed from the perspective shown in FIG. 14*a*. In one embodiment, the piezoelectric elements 5500A and 5500B can be angled a magnitude of three degrees with respect to one another, but other angles can also be used, in accordance with the needs of the particular application. Further, each piezoelectric element 5500A and 5500B is independently connected to an electrical source such that biasing of each element can selectively occur independently of one another to effect transducer movement. Each piezoelectric element can take a variety of forms, such as singulated elements, deposited films, or another suitable form.

Figure 16A:
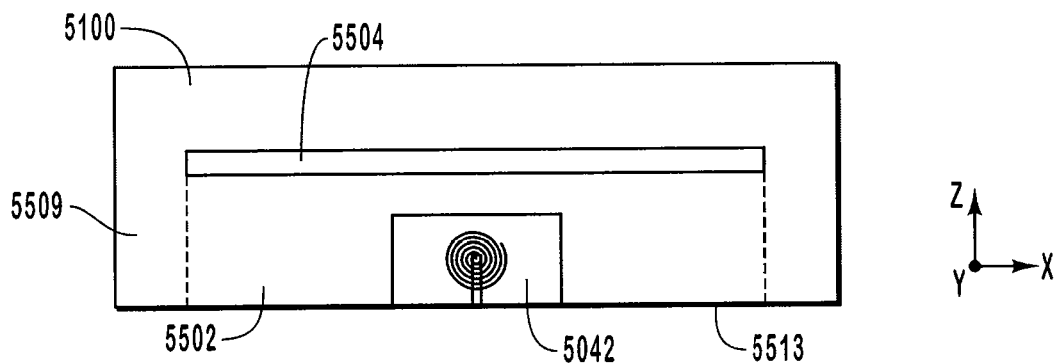
FIG. 16a is a simplified front view of the recording head of FIG. 15a, wherein the discrete piezoelectric elements are shown in a first, unactuated state.
Figure 16B:
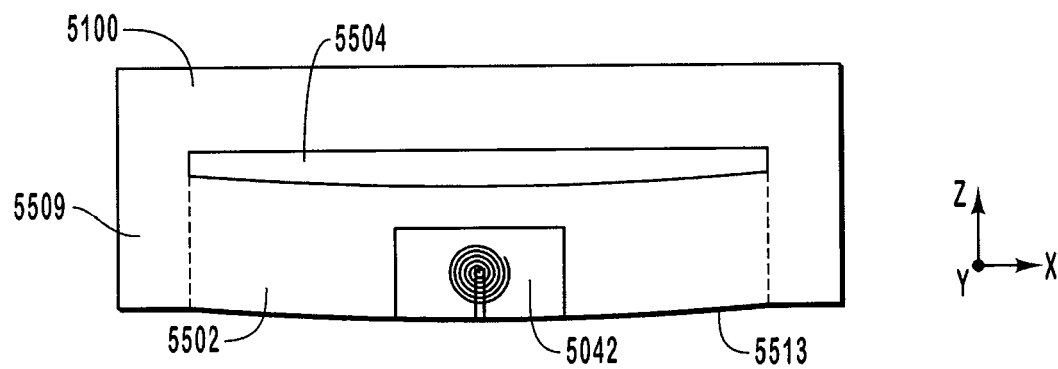
FIG. 16b is a simplified front view of the recording head of FIG. 15a, wherein both discrete piezoelectric elements are in an actuated state.
Figure 16C:
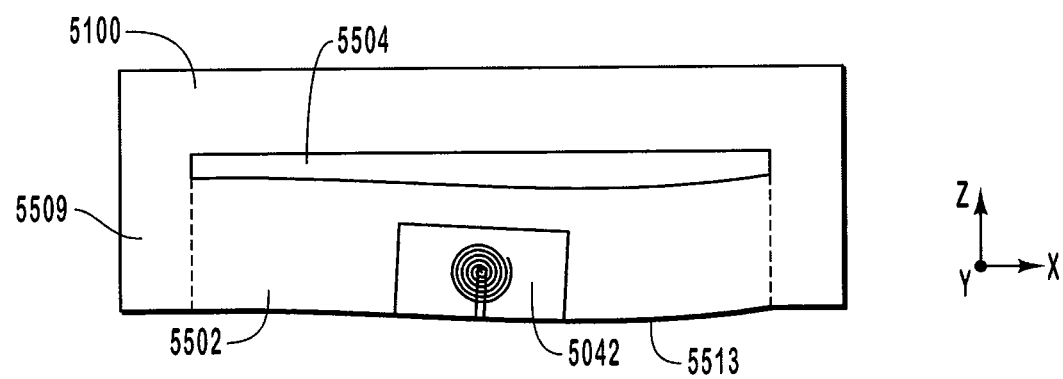
FIG. 16c is a simplified front view of the recording head of FIG. 15a, wherein only one of the discrete piezoelectric elements is in an actuated state.

With continuing reference to FIGS. 14*a*-15*b*, reference is now made to FIGS. 16*a*-16*c* in describing operation of the recording head 5030 of the present embodiment. Generally, a small electrical potential imposed on a piezoelectric element will cause the element to slightly deform. Thus, when movement of the transducer 5043 is desired, an electrical voltage is placed on one or both piezoelectric elements 5500A and 5500B. The resulting slight deformation of one or both energized piezoelectric elements 5500A and 5500B causes a net force generally directed in the z- and x-axis directions. The interleaver assembly 5100, which houses the piezoelectric elements 5500A and 5500B, is deformed in response to the net forces provided by the piezoelectric elements, by virtue of the gaps 5504 and 5510, and the nature of the attachment of the interleaver assembly to the slider body 5032 about the area 5511. This ultimately results in a movement of a portion of the trailing face 5509 in the z-axis (fly height) direction, which as shown in FIG. 14*b* is accompanied by a slight widening of the central portion of the gap 5504. Similar operations can be performed to cause deformation in the x-axis (track-to-track) direction, as explained below.

With continuing reference to FIGS. 14*a*-15*b*, reference is now made to FIGS. 16*a*-16*c* in describing various details regarding operation of the recording head 5030 and the interleaver assembly 5100 using piezoelectric motional forces, in causing the transducer 5043 to move in the fly height and track-to-track directions. As mentioned, the transducer body 5042, which houses the transducer 5043, is directly attached to the trailing surface 5509 of the interleaver 5100. FIG. 16*a* shows the interleaver assembly 5100 in a non-actuated state, wherein the piezoelectric elements 500A and 500B are not activated and no deflection of the gap 5504 or the interleaver bottom surface 5513 is present. In contrast, FIG. 16*b* shows the interleaver assembly 5100 in an actuated state, wherein separate electrical signals are provided equally to both piezoelectric elements 5500A and 5500B, as described above, to produce a motional force and cause corresponding equal deformation of the piezoelectric elements. As explained, deformation of the piezoelectric elements 5500A and 5500B results in corresponding deformation of a portion of the interleaver assembly 5100, including the gap 5504, and a portion 5502 of the interleaver assembly disposed between the gap and the bottom surface 5513. Deformation of the interleaver assembly in this manner is in a downward z-axis (fly height) direction. Correspondingly, because of its attachment to the trailing surface 5509 of the interleaver assembly 5100, the transducer body 42, and hence, the transducer 5043 itself, is also moved in the fly height direction, as desired. The distance moved by the transducer 5043 in the fly height direction is dependent on the magnitude of the actuation signals imposed on the piezoelectric elements 5500A and 5500B; the greater the signal magnitude, the greater the resulting transducer movement.

Note that the piezoelectric elements 5500A and 5500B are positioned in the interleaver assembly 5100 as to function in a resilient manner such that, when activation of the piezoelectric elements is terminated, deformation of the elements cease, and the interleaver assembly and the transducer body 5042 to return to their original positions, as shown in FIG. 16*a*.

FIG. 16*c* shows the interleaver assembly 5100 in a partially actuated state, wherein an electrical signal has been imposed only on the second piezoelectric element 5500B to provide a partial motional force. This causes only a portion of the interleaver assembly 5100 to be deflected in the z-axis, fly height direction. This partial deflection results in a slight rotation of the interleaver assembly portion 5502 about the y-axis, as represented by the coordinate axes in FIGS. 16*a*-*c*. The transducer body 5042 is also rotated about the y-axis. Rotation of the transducer body 5042 equates to movement of the transducer 5043 in a track-to-track direction, as shown in FIG. 16*c*, which provides for selective microadjustment of the transducer with respect to a magnetic medium surface 52 (FIG. 8), in accordance with principles of the present invention. More generally, it is seen that a combination of actuation signals can be used with one or both piezoelectric elements 5500A and 5500B to desirably generate a combination of fly height and track-to-track motions.

In one embodiment, each piezoelectric element 5500A and 5500B has a length of approximately 500 microns and is angled with respect to the other piezoelectric element by approximately three degrees. Such a configuration yields transducer fly height motion in a range of less then 10 microns and track-to-track motion in a range of less than one micron, with the resonant frequencies of the piezoelectric devices exceeding approximately 50 kHz. Such motions can be optimized by positioning the piezoelectric elements 5500A and 5500B at relatively shallow angles with respect to one another and by minimizing the stiffness of the piezoelectric elements.

Figure 17:
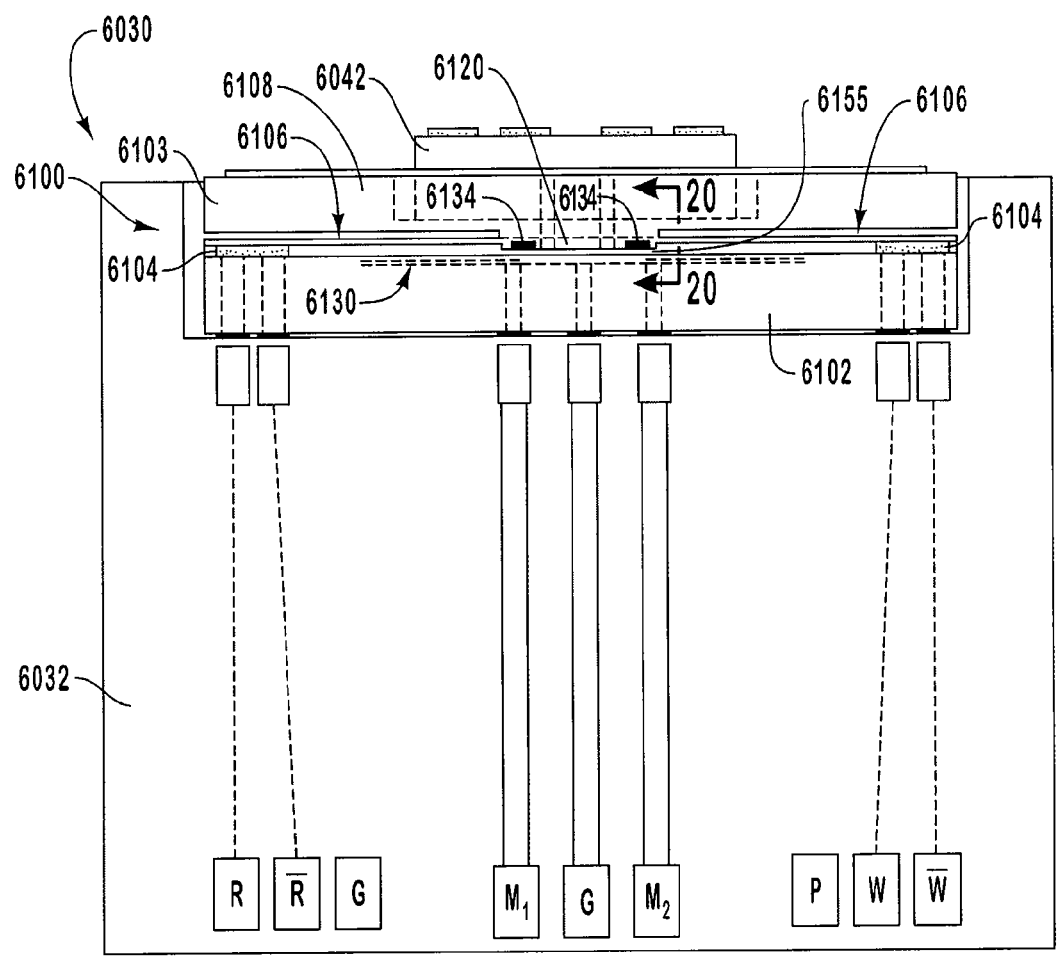
FIG. 17 is a top view of a recording head made in accordance with yet another embodiment of the present invention.
Figure 18:
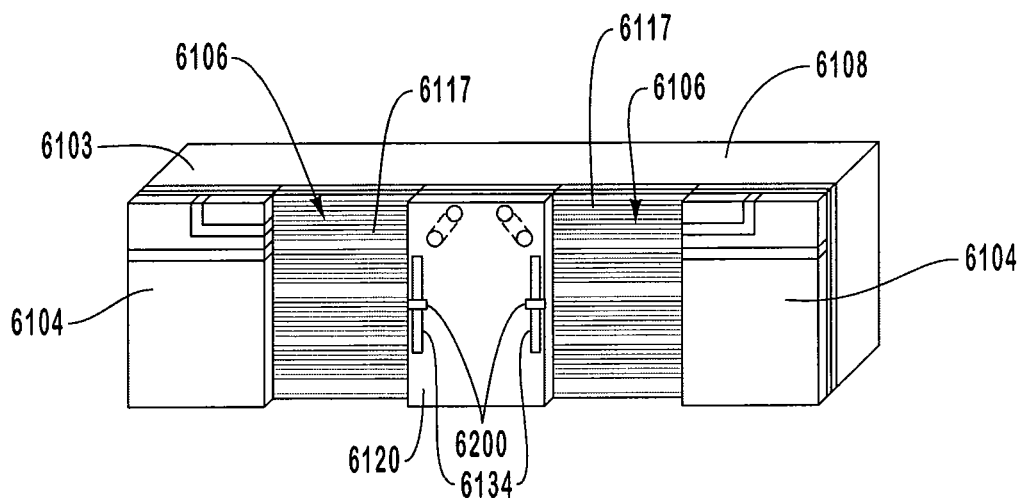
FIG. 18 is a cross sectional view of the recording head of FIG. 17, taken along the line 18-18.
Figure 19:
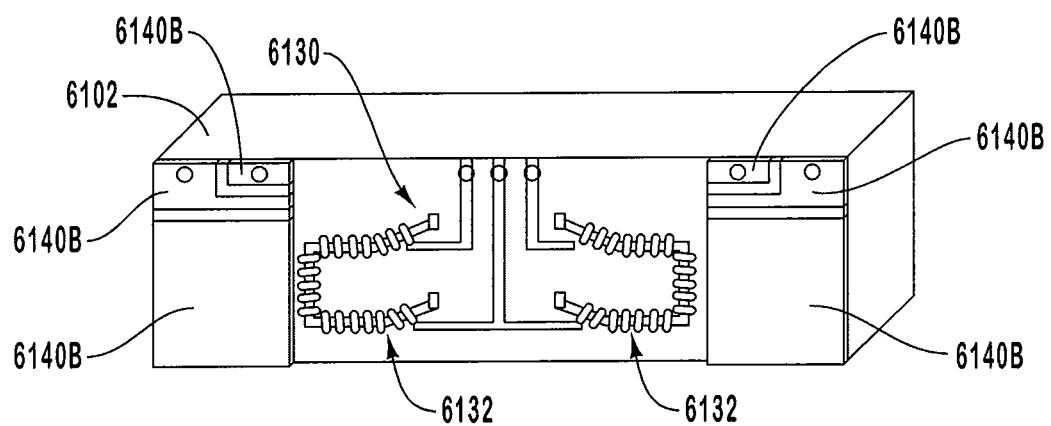
FIG. 19 is a cross sectional view of the recording head of FIG. 17, taken along the line 19-19.

Reference is now made to FIGS. 17-19, which depict various features of another embodiment of the present invention. In detail, FIG. 17 shows portions of a recording head, generally designated at 6030, including a slider body 6032, a transducer body 6042 having a transducer disposed therein, and a wafer assembly 6100.

In greater detail, the wafer assembly 6100 includes a motor segment 6102 and a flexure segment 6103. FIG. 18 shows various features of the flexure segment 6103, including interconnect regions 6104, flexure assemblies 6106 that each include a plurality of flexure beams 6117, a body portion 6108, and a central portion 6120 of the body portion.

FIG. 19 shows various features of the motor segment 6102, including various contact pads 6140B that are employed in electrically connecting the motor segment with the flexure segment 6103. The motor segment 6102 attaches to the flexure segment 6103 in relation to the slider body 6032 as shown in FIG. 17. Further details regarding the structure and function of the recording head 6030 and its various components in providing bi-directional transducer movement can be found in the '641 application.

FIGS. 18 and 19 further depict various components of a motor 6130 including, on the flexure segment 6103, a pair of closure bars 6134 positioned on the central portion 6120 and, on the motor segment 6102, a pair of magnetic flux sources, in this embodiment, toroidal coils 6132. As with other embodiments, the motor 6130 is employed to provide a motional force to the plurality of flexure beams 6117 located in both flexure assemblies 6106. In brief, selective activation of the toroidal coils 6132 of the motor segment 6102 causes an electromagnetic attractive force to be imposed on the closure bars 6134 of the flexure segment 6103, which closure bars are, in the present embodiment, composed of a metallic material that is suitable for electromagnetic attraction to the toroidal coils 6132. This results in movement of the central portion 6120 and the body portion 6108 toward the motor segment 6102 via flexure of the plurality of flexure beams 6117. Movement of the body portion 6108 in turn results in specified movement of the transducer body 6042 attached thereto. Thus, activation of the toroidal coils 6132, or other suitable components, can be customized to provide bi-directional movement of the transducer body 6042 in track-to-track and fly height directions with respect to the surface of a magnetic storage medium (such as that shown in FIG. 8).

Figure 20:
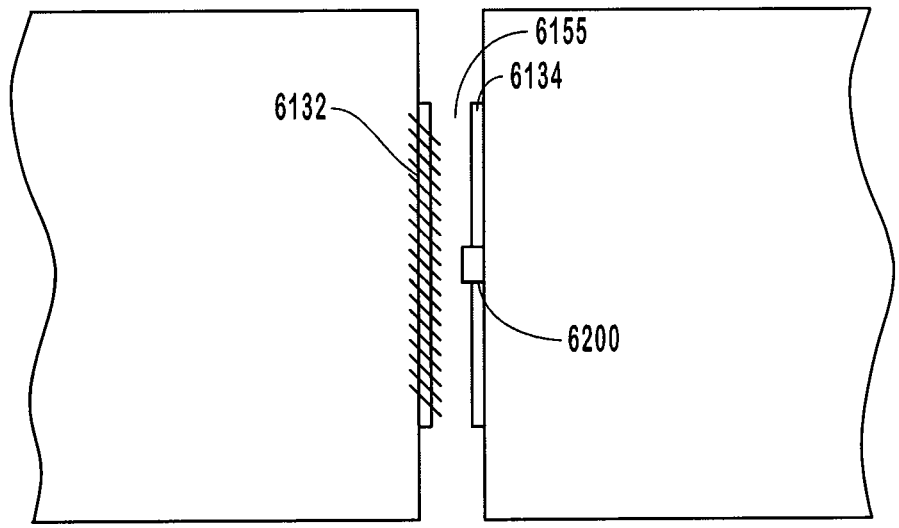
FIG. 20 is a cross sectional/side view of the recording head of FIG. 17, taken along the line 20-20, showing portions of a motor assembly.
Figure 21:
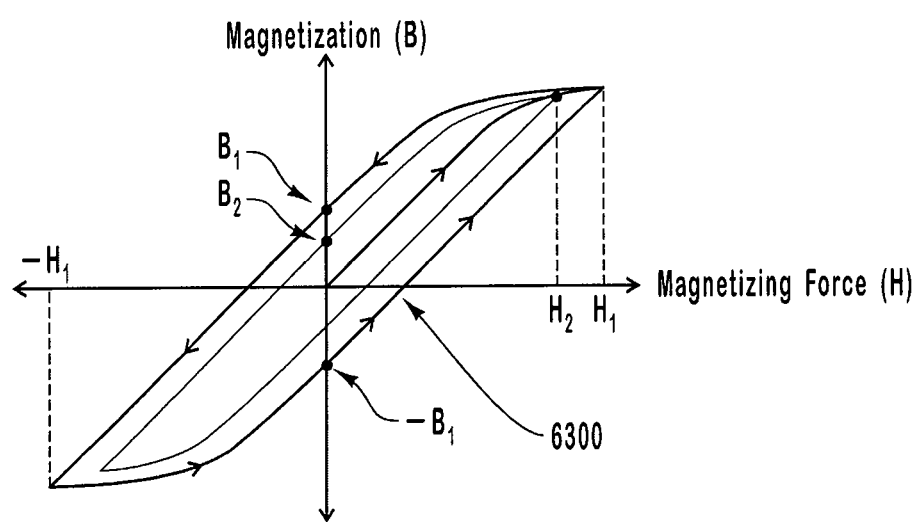
FIG. 21 is a graph showing the relationship between magnetizing force and magnetization in a ferromagnetic material with respect to the motor assembly of FIG. 20.

With continuing reference to FIGS. 17-19, reference is now made to FIGS. 820 and 21. In particular, FIG. 20 depicts a cross sectional/side view of the motor segment 6102 and flexure segment 6103 along the lines 20-20 of FIG. 17. In detail, FIG. 20 shows side views of an adjacent pair of one toroidal coil 6132 and one closure bar 6134. In accordance with the present embodiment, each of the closure bars 6134 includes a magnetic portion 6200 positioned centrally along the closure bar. The magnetic portion 6200 is included in the closure bar to assist in the operation of the closure bar within the motor 6130 during operation of the interleaver assembly 6100 in bi-directionally positioning the transducer, as will be explained.

In one embodiment, the magnetic portion 6200 is composed of a hard, or permanent magnetic material that is not easily demagnetized, such as SmCo. In other embodiments, however, other magnetic materials, including softer or harder magnetic materials can also be employed in accordance with the needs of a particular application. In addition, though shown in FIG. 20 to be centrally positioned on the closure bar 6134, the magnetic portion 6200 can be positioned on other portions of the closure bars, can have respectively different positions on each closure bar, or can be positioned apart from the closure bars. In yet other embodiments, each closure bar 6134 can have more than one magnetic portion. Though they are described herein in connection with the recording head shown in FIG. 17, it is nonetheless appreciated that the magnetic portions of the present embodiment can also be included as components of the other recording heads described herein and of the recording heads described in the aforementioned applications incorporated herein by reference.

The mass of each magnetic portion 6200 is determined by several factors, including the attractive force to be supplied by each magnetic portion, and the type of material from which the magnetic portion is formed.

By using a hard magnetic material that can retain its magnetism, a level of attractive force can be maintained between the closure bars 6134 and the toroidal coils 132 even when no external power is activated. This enables a relatively smaller gap 6155 to be maintained when the motor 6130 is unactuated. Moreover, when the motor 6130 is actuated to draw the central portion 6120 of the body portion 6108 toward the motor segment 6102 during transducer positioning, relatively less energy is required to close the gap 6155 because the initial spacing of the gap is already smaller than it otherwise would be without the additional magnetic force provided by the magnetic portion 6200.

FIG. 21 illustrates details regarding the magnetic properties of a hard magnetic material that can be used to form the magnetic portion 6200 shown in FIG. 20. In general, when a ferromagnetic material is subjected to a continuously increasing magnetizing force (H), the material becomes magnetized and retains some of the magnetization (B) when the magnetizing force is removed, as shown in the hysteresis loop depicted at 6300 in FIG. 21. This retained magnetization is also known as remnant magnetization. The amount of retained or remnant magnetization depends on the magnitude of the original magnetizing force. For instance, if the ferromagnetic material is initially exposed to a magnetization force of $H_1$ as shown on FIG. 9, then the material will retain a magnetic field equal to $B_1$ when the magnetization force is removed. Similarly, if the ferromagnetic material is initially exposed only to a lower magnetization force of $H_2$ as shown on FIG. 9, then the material will retain a magnetic field equal to $B_2$ when the magnetization force is removed, which is proportionately lower than $B_1$. Thus, a desired level of retained magnetization can be obtained by simply initially exposing the material to a particular level of magnetization force.

In one embodiment, calibration of the magnetic portion-equipped motor 6130 is necessary, and can proceed as explained here. During manufacture of the recording head, such as the recording head 6030 shown in FIG. 17, the motor 6130 is constructed as disclosed in the '641 application, or by another suitable process. During motor assembly, the magnetic portions 6200 are added to each closure bar 6134, as shown in FIG. 18.

Next, a lapping process can be performed to properly shape the transducer body 6042. During lapping, the transducer (not shown) is brought into full contact with a lapping surface by energizing the toroidal coils 6132 of the motor 6130 with an electrical current. This causes the toroidal coils 6132 to become fully magnetized, thereby inducing a corresponding magnetizing force on the closure bars 6134. The magnetizing force imposed on the closure bars 6134 is represented on the hysteresis loop 6300 at $H_1$ on FIG. 9. As a result of this magnetizing force, the magnetic portion 6200 of each closure bar 6134 becomes magnetized and retains after the termination of toroidal coil energization a remnant magnetization corresponding to $B_1$ on FIG. 9.

Once the lapping process is complete, the toroidal coils 6132 are again energized, but with a bias opposite that used during the initial energization discussed above. This results in full separation of the transducer from the lapping surface as well as the induction of a magnetizing force on the closure bars 6134 corresponding to $-H_1$ on FIG. 9. The magnetization of the hard magnetic material 6200 also changes as a result, retaining a remnant magnetization corresponding to $-B_1$ on FIG. 9 once energization of the toroidal coils 6132 in this step in terminated.

At this point, an optimum rest-state transducer fly height with respect to the surface of the magnetic storage medium surface (not shown) is determined, and a corresponding remnant magnetization value for the magnetic portion 6200 of the closure bars 6134 that will maintain the transducer at the optimum fly height when the toroidal coils 6132 are not energized is calculated. An electrical current that corresponds with the corresponding remnant magnetization value is then provided to the toroidal coils 6132 sufficient, which in turn generates the magnetization force required to induce the calculated amount of remnant magnetization on the magnetic portions 6200. When the toroidal coil current is subsequently removed, the magnetic portions 6200, and hence the closure bars 6134, retain the correct amount of magnetization to maintain the gap 6155 and sustain the transducer at the desired rest-state fly height.

Note that various steps in addition to or alternative to those described above can be employed to calibrate the magnetic portions, according to need and the particular configuration thereof. Further, though the calibration of the magnetic portions is performed in connection with a lapping process here, in other embodiments, such calibration can occur independent of other recording head manufacturing or assembly processes.

In one embodiment wherein the magnetic portions are composed of a hard magnetic material, the length of the closure bars is minimized over closure bars not including magnetic portions as the permeability of the hard magnetic material is typically much lower than that of materials commonly used in forming closure bars, such as permalloy, for instance. In one embodiment the material from which the magnetic portions are composed possesses a low squareness, which enables the remnant magnetic strength to remain unchanged over the range of currents that will be used in connection with operation of the motor. This further ensures a linear range of currents can be used for actuation of the motor.

The present invention may be embodied in other specific forms without departing from its spirit or essential characteristics. The described embodiments are to be considered in all respects only as illustrative, not restrictive. The scope of the invention is, therefore, indicated by the appended claims rather than by the foregoing description. All changes that come within the meaning and range of equivalency of the claims are to be embraced within their scope.

What is claimed is:

1. A head, comprising:
   a slider body;
   a transducer body;
   a transducer connected to the transducer body; and
   an interleaver assembly interconnecting the slider body and the transducer body, the interleaver assembly comprising:
      an interleaver body to which the transducer body is attached, the interleaver body having one or more flexible surfaces that enable temporary deformation of at least one portion of the one or more flexible surfaces of the interleaver body in response to exertion of a force on the interleaver body, the interleaver body including a first gap on an inner face thereof, the first gap being positioned parallel to a surface of a magnetic medium and in communication with a second gap in the in the interleaver body, the second gap being positioned between the inner face of the interleaver body and a trailing face of the interleaver body, the first and second gaps providing a lack of physical connection in an area between the slider body and the interleaver body, the first and second gaps enabling selective deformation of the interleaver body and of the gaps themselves, which provides selective movement of the transducer; and
      piezoelectric elements positioned below the second gap and proximate the inner face of the first gap in the interleaver body, the piezoelectric elements operable such that, when selectively actuated, the piezoelectric elements exert a force on the interleaver body so as to effect selective movement of the transducer with respect to a surface of a medium.

2. The head as recited in claim 1, wherein the piezoelectric elements are operable to cause deformation of the interleaver body in both a first direction and a second direction.

3. The head as recited in claim 2, wherein the piezoelectric elements are operable to cause deformation of the interleaver body in both directions at once.

4. The head as recited in claim 2, wherein the first direction is a fly height direction, and the second direction is a track-to-track direction.

5. The head as recited in claim 1, wherein the head is a recording head, the transducer is magnetic, and the medium is a magnetic medium.

6. A recording head, comprising:
   a slider body;
   a transducer body containing a transducer;
   an interleaver assembly interconnecting the slider body and the transducer body, the interleaver assembly comprising:
      an interleaver body having a first gap defined on an inner portion therein to enable deformation of a first flexible body portion of the interleaver body that enables temporary deformation of at least one portion of the flexible body portion, the first body portion having the transducer body attached thereto, the first gap being positioned parallel to a surface of a magnetic medium and in communication with a second gap in the in the interleaver body, the second gap being positioned between the inner face of the interleaver body and a trailing face of the interleaver body, the first and second gaps providing a lack of physical connection in an area between the slider body and the interleaver body, the first and second gaps enabling selective deformation of the interleaver body and of the gaps themselves, which provides selective movement of the transducer; and
      a piezoelectric element positioned below the second gap and proximate the inner face of the first gap in the interleaver body, the piezoelectric element operable to be selectively actuated to deform the first body portion so as to selectively move the transducer with respect to a surface of a magnetic medium associated with the recording head.

7. The recording head as recited in claim 6, wherein the interleaver assembly is electrically connected to the slider body and to the transducer body.

8. The recording head as recited in claim 6, wherein a geometry of the gap is responsive to the piezoelectric element such that the piezoelectric element is operable to temporarily modify the geometry of the gap.

9. The recording head as recited in claim 6, wherein the gap of the interleaver body further includes a first gap portion that is configured to be positioned parallel to the surface of the magnetic medium, and a second gap portion in communication with the first gap portion and configured to be positioned perpendicular to the magnetic medium surface.

10. The recording head as recited in claim 9, wherein the first and second gap portions are in communication such that a cross section of the first and second gap portions is "L" shaped, and wherein the first and second gap portions are positioned adjacent to the first body portion of the interleaver body.

11. The recording head as defined in claim 9, wherein the second gap portion defines a region of the interleaver body that is attached to the slider body such that deformation of the first body portion of the interleaver body is enabled.

12. The recording head as recited in claim 11, wherein the interleaver body is attached to the slider body about the second gap portion.

13. The recording head as recited in claim 6, further comprising an additional piezoelectric element positioned in the interleaver body.

14. The recording head as recited in claim 13, wherein the piezoelectric elements are configured to be independently actuated with respect to one another.

15. The recording head as recited in claim 13, wherein the piezoelectric elements are composed of deposited films.

16. The recording head as recited in claim 13, wherein the piezoelectric elements are angled with respect to one another at least during actuation of the piezoelectric elements.

17. The recording head as recited in claim 16, wherein the piezoelectric elements are angled at approximately three degrees with respect to one another at least during actuation of the piezoelectric elements.

18. The recording head as recited in claim 13, wherein the piezoelectric elements are operable to deflect the interleaver body in two different directions.

19. The recording head as recited in claim 18, wherein the piezoelectric elements are operable to deflect the interleaver body in the two different directions simultaneously or serially.

20. The recording head as recited in claim 18, wherein one of the piezoelectric elements is operable to deflect the interleaver body in a first of the two different directions, and the other of the piezoelectric elements is operable to deflect the interleaver body in a second of the two different directions.

21. The recording head as recited in claim 13, wherein the piezoelectric elements are operable to deflect the interleaver body in one or both of an x-axis direction and a z-axis direction.

22. The recording head as recited in claim 21, wherein the x-axis direction is a track-to-track direction, and the z-axis direction is a fly height direction.

23. The recording head as recited in claim 21, wherein the piezoelectric elements are operable to deflect the interleaver body in both the x-axis direction and the z-axis direction such that the interleaver body exhibits deflections in both the x-axis direction and the z-axis direction at the same time.

24. The recording head as recited in claim 13, wherein each piezoelectric element is independently connected to an electrical source.

* * * * *